US011423665B2

(12) United States Patent
Al-Dahle et al.

(10) Patent No.: US 11,423,665 B2
(45) Date of Patent: Aug. 23, 2022

(54) INTENTION RECOGNITION

(71) Applicant: Apple Inc., Cupertino, CA (US)

(72) Inventors: Ahmad Al-Dahle, Cupertino, CA (US); Bruno A. Hexsel, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 135 days.

(21) Appl. No.: 16/899,242

(22) Filed: Jun. 11, 2020

(65) Prior Publication Data

US 2020/0302194 A1   Sep. 24, 2020

Related U.S. Application Data

(63) Continuation of application No. 15/758,330, filed as application No. PCT/US2016/050621 on Sep. 8, 2016, now abandoned.

(Continued)

(51) Int. Cl.
*G06V 20/58* (2022.01)
*G08G 1/16* (2006.01)
(Continued)

(52) U.S. Cl.
CPC ............ *G06V 20/58* (2022.01); *B60W 30/095* (2013.01); *B60W 30/0956* (2013.01);
(Continued)

(58) Field of Classification Search
CPC .......... G06K 9/00805; G06K 9/00342; B60W 30/0956; B60W 30/095; G08G 1/096741;
(Continued)

(56) References Cited

U.S. PATENT DOCUMENTS 8,244,408 B2    8/2012   Lee et al.
8,457,827 B1 *  6/2013   Ferguson ............ B60W 30/095
                                                701/23
(Continued)

FOREIGN PATENT DOCUMENTS

CN    101275840    10/2008
CN    101813492    8/2010
(Continued)

OTHER PUBLICATIONS

S. Kohler et al., "Autonomous Evasive Maneuvers Triggered by Infrastructure-Base Detection of Pedestrian Intentions", 2013 IEEE Intelligent Vehicles Symposium, Jun. 23-26, 2013, pp. 1-8.

(Continued)

*Primary Examiner* — Thomas Ingram
(74) *Attorney, Agent, or Firm* — Robert C. Kowert; Kowert, Hood, Munyon, Rankin & Goetzel, P.C.

(57) ABSTRACT

Some embodiments provide an autonomous navigation system which autonomously navigates a vehicle through an environment based on predicted trajectories of one or more separate dynamic elements through the environment. The system identifies contextual cues associated with a monitored dynamic element, based on features of the dynamic element and actions of the dynamic element relative to various elements of the environment, including motions relative to other dynamic elements. A monitored dynamic element can be associated with a particular intention, which specifies a prediction of dynamic element movement through the environment, based on a correlation between identified contextual cues associated with the monitored dynamic element and a set of contextual cues which are associated with the particular intention. A predicted trajectory of the dynamic element is generated based on an associated intention. A targeted signal can be directed to a (Continued)

target dynamic element based on a predicted trajectory of the dynamic element.

20 Claims, 9 Drawing Sheets

Related U.S. Application Data

(60) Provisional application No. 62/215,672, filed on Sep. 8, 2015.

(51) Int. Cl.
| | | |
|---|---|---|
| *G08G 1/0967* | (2006.01) | |
| *G08G 1/0962* | (2006.01) | |
| *G08G 1/005* | (2006.01) | |
| *B60W 30/095* | (2012.01) | |
| *G06V 40/20* | (2022.01) | |
| *G05D 1/02* | (2020.01) | |

(52) U.S. Cl.
CPC ......... *G05D 1/0214* (2013.01); *G05D 1/0246* (2013.01); *G05D 1/0257* (2013.01); *G06V 40/23* (2022.01); *G08G 1/005* (2013.01); *G08G 1/09626* (2013.01); *G08G 1/096716* (2013.01); *G08G 1/096741* (2013.01); *G08G 1/096791* (2013.01); *G08G 1/166* (2013.01)

(58) Field of Classification Search
CPC ............. G08G 1/005; G08G 1/096791; G08G 1/09626; G08G 1/096716; G08G 1/166; G08G 1/0257; G05D 1/0257; G05D 1/0215
See application file for complete search history.

(56) References Cited

U.S. PATENT DOCUMENTS

| | | | |
|---|---|---|---|
| 9,248,834 B1* | 2/2016 | Ferguson | G05D 1/0088 |
| 9,429,946 B2 | 8/2016 | Chen et al. | |
| 2009/0024357 A1* | 1/2009 | Aso | G08G 1/167 |
| | | | 702/181 |
| 2010/0228419 A1* | 9/2010 | Lee | G05D 1/0246 |
| | | | 701/25 |
| 2013/0094331 A1* | 4/2013 | Watanabe | A61H 3/061 |
| | | | 367/137 |
| 2013/0261872 A1 | 10/2013 | Ferguson et al. | |
| 2013/0345959 A1 | 12/2013 | van Os et al. | |
| 2015/0206001 A1* | 7/2015 | Maurer | G06K 9/00805 |
| | | | 382/103 |
| 2017/0276506 A1* | 9/2017 | McDunn | H04W 4/027 |
| 2018/0082587 A1* | 3/2018 | Wan | B60Q 1/503 |
| 2018/0260635 A1 | 9/2018 | Al-Dahle et al. | |

FOREIGN PATENT DOCUMENTS

| | | |
|---|---|---|
| CN | 103171439 | 6/2013 |
| CN | 104054119 | 9/2014 |
| CN | 104271420 | 1/2015 |
| CN | 104335008 | 2/2015 |
| DE | 102014201159 | 7/2015 |
| FR | 2869121 | 10/2005 |
| WO | 2012001871 | 1/2012 |

OTHER PUBLICATIONS

U.S. Appl. No. 15/758,220, filed Mar. 7, 2018, Ahmad Al-Dahle et al.
Office Action from Chinese Application No. ZL201680049892.1, dated Sep. 4, 2020, (English translation and Chinese Version), pp. 1-15.
Balazs Nemeth et al., "LPV-based Control Design of an Adaptive Cruise Control System for Road Vehicles", 2015 IFAC (International Federation of Automatic Control), pp. 62-66.
Yuan Zhu, "Research on Decision Mechanism and Control of Autonomous Lane Changing of Intelligent Vehicles Based on Vision and Radar", Chinese version only, China Doctoral Dissertation, Dec. 15, 2014, pp. 1-140.
Office Action from Chinese Application No. 201680049892.1, dated May 9, 2020, (Englsih translation and Chinese version), pp. 1-35.

* cited by examiner

INTENTION RECOGNITION

This application is a continuation of U.S. patent application Ser. No. 15/758,330, filed Mar. 7, 2018, which is a 371 of PCT Application No. PCT/US2016/050621, filed Sep. 8, 2016, which claims benefit of priority to U.S. Provisional Patent Application No. 62/215,672, filed Sep. 8, 2015, which are hereby incorporated by reference herein in their entirety.

BACKGROUND

Technical Field

This disclosure relates generally to autonomous navigation of a vehicle, and in particular to an autonomous navigation system which can be included in a vehicle and which navigates the vehicle in an environment, which includes various dynamic elements, based on predicting trajectories of the dynamic elements based on recognizing contextual cues associated with the elements and the environment.

Description of the Related Art

The rise of interest in autonomous navigation of vehicles, including automobiles, has resulted in a desire to develop autonomous navigation systems which can autonomously navigate (i.e., autonomously "drive") a vehicle through various routes, including one or more roads in a road network, such as contemporary roads, streets, highways, etc.

In some cases, autonomous navigation is enabled via an autonomous navigation system (ANS) which can process and respond to detection of various elements in an external environment, including static features (e.g., roadway lanes, road signs, etc.) and dynamic features (present locations of other vehicles in a roadway on which the route extends, present locations of pedestrians, present environmental conditions, roadway obstructions, etc.) along a route in real-time as they are encountered, thereby replicating the real-time processing and driving capabilities of a human being.

In some cases, autonomous navigation includes navigating a vehicle in response to detection of one or more traffic participants in the environment through which the vehicle is being navigated. For example, where another vehicle is detected ahead of the navigated vehicle and is determined to be moving slower than the navigated vehicle, such that the navigated vehicle is approaching the other vehicle, the navigated vehicle can be slowed or stopped to prevent the vehicle paths intersecting. In another example, where a pedestrian is identified near an edge of the roadway along which the vehicle is being navigated, the vehicle can be slowed or stopped in response to detection of the pedestrian.

SUMMARY OF EMBODIMENTS

Some embodiments provide an autonomous navigation system which autonomously navigates a vehicle through an environment based on predicted trajectories of one or more separate dynamic elements through the environment. The system identifies contextual cues associated with a monitored dynamic element, based on features of the dynamic element and actions of the dynamic element relative to various elements of the environment, including motions relative to other dynamic elements. A monitored dynamic element can be associated with a particular intention, which specifies a prediction of dynamic element movement through the environment, based on a correlation between identified contextual cues associated with the monitored dynamic element and a set of contextual cues which are associated with the particular intention. A predicted trajectory of the dynamic element is generated based on an associated intention. A targeted signal can be directed to a target dynamic element based on a predicted trajectory of the dynamic element.

Some embodiments provide an apparatus which includes an autonomous navigation system which can be installed in a vehicle and can autonomously navigate the vehicle through an environment in which the vehicle is located. The autonomous navigation system is configured to identify a set of contextual cues associated with a dynamic element located in the environment, wherein each contextual cue indicates one or more particular features associated with the dynamic element, based on monitoring at least a portion of the environment; associate the dynamic element with a particular set of predicted motions, based on a determination of a correlation between the identified set of contextual cues and a predetermined set of contextual cues which are associated with the particular set of predicted motions; generate a predicted trajectory of the dynamic element through the environment based on the particular set of predicted motions associated with the dynamic element; and generate a set of control commands which, when executed by one or more control elements installed in the vehicle, cause the vehicle to be navigated along a driving route which avoids intersection with the predicted trajectory of the dynamic element.

Some embodiments provide a method which includes identifying a set of contextual cues associated with a dynamic element located in the environment, wherein each contextual cue indicates one or more particular features associated with the dynamic element, based on monitoring at least a portion of the environment; associating the dynamic element with a particular set of predicted motions, based on a determination of a correlation between the identified set of contextual cues and a predetermined set of contextual cues which are associated with the particular set of predicted motions; generating a predicted trajectory of the dynamic element through the environment based on the particular set of predicted motions associated with the dynamic element; and generating a set of control commands which, when executed by one or more control elements installed in the vehicle, cause the vehicle to be navigated along a driving route which avoids intersection with the predicted trajectory of the dynamic element.

Figure 1:
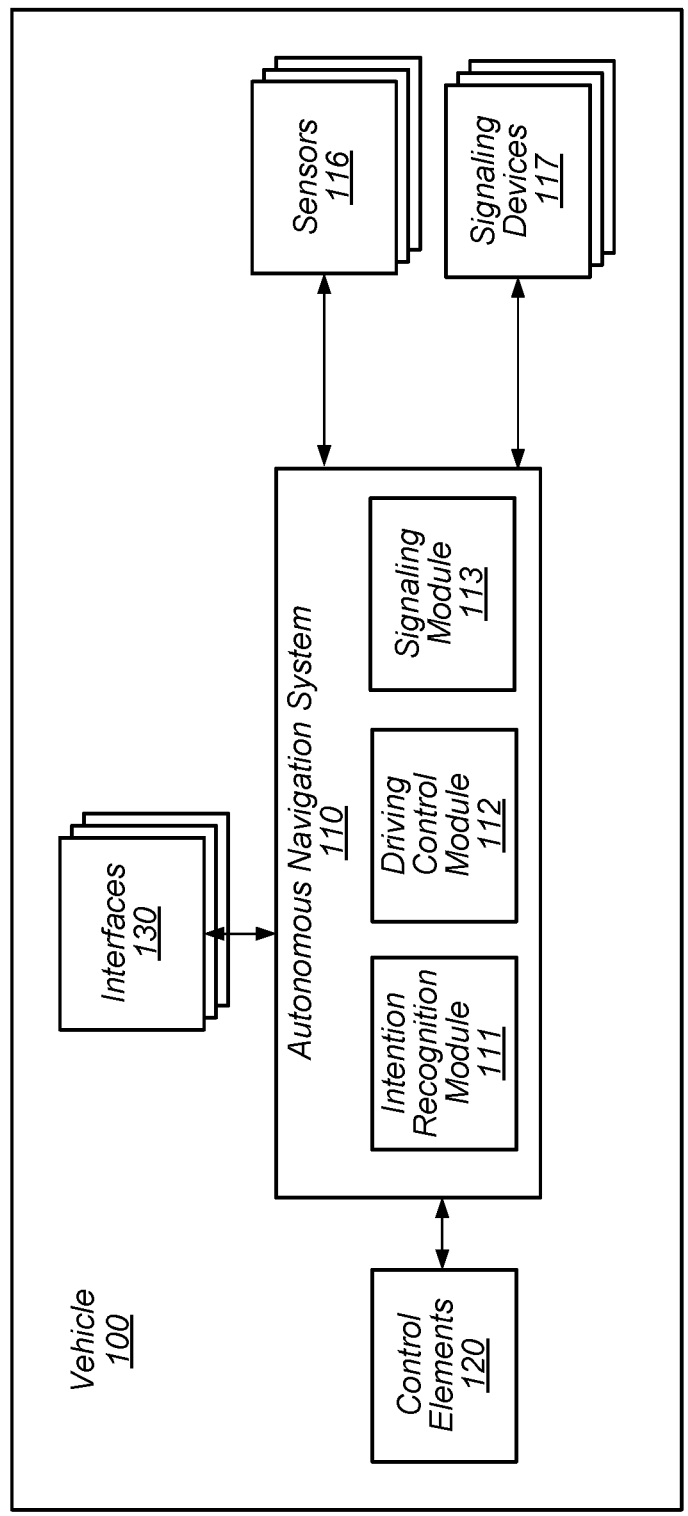
FIG. 1 illustrates a schematic block diagram of a vehicle which comprises an autonomous navigation system (ANS), according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . " Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue.

"Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Some embodiments include one or more vehicles in which an autonomous navigation system ("ANS") is included, where the ANS identifies dynamic elements in a common external environment in which the one or more vehicles are located, predicts a trajectory of certain dynamic elements based on contextual cues associated with one or more of the dynamic elements, and autonomously navigates the vehicle based on the predicted trajectories of the dynamic elements along a driving route which avoids intersections with the trajectories of the dynamic elements. Autonomously navigating a vehicle along a driving route which avoids intersections with the trajectories of one or more of the dynamic elements includes navigating the vehicle along a driving route which avoids paths intersecting between the one or more vehicles and the one or more dynamic elements.

In some embodiments, the ANS autonomously navigates the vehicle along a driving route via generation of control commands associated with various control elements of the vehicle, where the control commands, when received at the associated control elements, cause the control elements to navigate the vehicle along the driving route.

In some embodiments, the ANS generates a driving route through an external environment based at least in part upon various static elements and dynamic elements included in the external environment. Static elements can include roadway features, including roadway lanes, curbs, etc., traffic signs and traffic signals, flora, artificial structures, inanimate objects, etc. Dynamic elements can include a time of day, local weather conditions, fauna, traffic participants, etc. in the external environment. Traffic participants can include vehicles, pedestrians, some combination thereof, etc. located in the external environment, including traffic participants located proximate to or in the roadway along which the vehicle is located.

The ANS, in some embodiments, generates a driving route based on various detected static elements and dynamic elements in the external environment, where the driving route includes a route, via which the vehicle can be navigated through the external environment, which avoids intersection of the vehicle with one or more static elements, dynamic elements, etc. located in the external environment. For example, a driving route through an external environment can include a route which avoids intersection with a static obstacle in the roadway along which the vehicle is being navigated, a traffic participant which includes another vehicle navigating along the roadway in an opposite direction of travel relative to the vehicle, etc.

In some embodiments, the ANS, to generate a driving route which avoids intersection of the vehicle with various dynamic elements in an external environment, generates predicted trajectories of one or more dynamic elements, including traffic participants, through at least a portion of the external environment. The ANS can generate, for a given dynamic element, including a pedestrian, a predicted trajectory of the dynamic element through the external environment for a particular future amount of elapsed time. A predicted trajectory can include a predicted position, velocity, acceleration, etc. of the dynamic element through the external environment at one or more future points in time. As a result, based on the predicted trajectory of the dynamic element, the ANS can predict a future position, velocity, acceleration, etc. of the dynamic element in the external environment at various future points in time. The ANS can generate a driving route along which the ANS can navigate a vehicle, where the driving route avoids intersection with the dynamic element at any of the future points in time, based on the predicted trajectory of the dynamic element.

In some embodiments, the ANS generates a predicted trajectory of a dynamic element through an external environment based on identifying various contextual cues associated with the dynamic element and further identifying an association between the identified contextual cues and a particular dynamic element intention which can be associated with the dynamic element. The various contextual cues can be identified based on processing sensor data, generated by various sensor devices, which includes information associated with various portions of the external environment, dynamic elements, static elements, etc. The association can include a predetermined association between a set of contextual cues and one or more particular dynamic element intentions, and identifying the association can be based on determining a correlation between the identified contextual cues and at least some of the contextual cues included in the association. Based on the correlation, the ANS can identify the one or more dynamic element intentions included in the association and can associate the identified intention with the one or more dynamic elements with which the correlated cues are associated. An intention specifies one or more predicted future motions of an associated dynamic element. The ANS can generate a particular predicted trajectory of the dynamic element based at least in part upon the associated intention.

In some embodiments, an ANS generates an association between a dynamic element intention and a set of contextual cues based on monitoring motions of a dynamic element in an external environment, which can include identifying various contextual cues associated with the dynamic element, tracking movement of the dynamic element through the environment, generating an intention which specifies the tracked movement of the dynamic element, and generating an association between the generated intention and a set of identified contextual cues associated with the dynamic element.

The ANS can revise, refine, change, etc. an association over time based on subsequent monitoring of one or more dynamic elements in one or more external environments. In some embodiments, the ANS associates a confidence value with a particular association and selectively enables the association to be used, in predicting dynamic element trajectories and generating driving routes, based on a determination that the confidence value associated with the association exceeds a predetermined threshold value. The confidence value can be adjusted based on repeated verifications that a dynamic element's actual movements through an environment at least partially correlates to the movements predicted by an intention which is associated with identified contextual cues associated with the dynamic element.

Autonomously navigating a vehicle through an environment based on dynamic element trajectories which are predicted based on contextual cues and associations between the contextual cues and the predicted trajectories can provide augmented navigation relative to autonomous navigation systems which predict future trajectories of dynamic elements based on tracked prior and present movement of the dynamic elements through the environment. For example, where a dynamic element which includes a pedestrian is observed, via sensor data generated by a vehicle sensor device, to approach a crosswalk across a roadway ahead of the vehicle at a particular rate of speed, the ANS can determine, based on various contextual cues identified from at least the sensor data, that the predicted trajectory of the pedestrian which is associated with the cues includes a trajectory which includes the pedestrian stopping at the edge of the crosswalk rather than continuing through the crosswalk at the observed particular rate of speed. As a result, the ANS can generate a driving route which causes the vehicle to be navigated through the crosswalk without decelerating, thereby providing augmented navigation control relative to a system which predicts the future trajectory of the pedestrian based on the pedestrian's movement towards the crosswalk, as such a system may predict that the pedestrian would continue into the roadway, through the crosswalk, without stopping and may thus command the vehicle to stop. Because the ANS predicts dynamic element trajectories based on contextual cues and associated intentions, rather than extrapolating present motion into future motion, the ANS can provide improved prediction of complex dynamic element trajectories and improved safety and navigation of the vehicle, based on navigating the vehicle based on the improved prediction of dynamic element motion through the external environment.

In some embodiments, the ANS generates one or more targeted signals which are transmitted through the external environment to one or more targeted elements in the external environment. The one or more targeted signals can include information, also referred to herein as "content", "signal content", etc., which is included in the targeted signal based on the element to which the targeted signal is transmitted. A targeted signal can include a signal which is directed to a particular "target" dynamic element in the environment and comprises a signal axis and angle which is focused on the target dynamic element so that the recipients of the targeted signal are at least partially restricted to the target dynamic element. In addition, in some embodiments, the targeted signal includes content which is particularly associated with the target dynamic element, relative to other dynamic elements in the environment. In some embodiments, the content is associated with a present state of the dynamic element, a predicted trajectory of the dynamic element, some combination thereof, etc. In some embodiments, the content comprises a message.

In some embodiments, the ANS generates the targeted signal directed at a particular target dynamic element based on a determination that the target dynamic element lacks perception of the vehicle in which the ANS is included, where the targeted signal includes content which provides an indication, to the dynamic element, of the presence of the vehicle in the environment. For example, where the dynamic element includes a pedestrian which is determinate to be oriented in a direction which results in the vehicle being outside of the field of view of the pedestrian, the ANS can generate a targeted signal to the pedestrian which provides the pedestrian with an indication that the vehicle is proximate to the pedestrian. As a result, the targeted signal augments the perception of the pedestrian, which can augment the safety of the vehicle and the pedestrian by mitigating a risk that the pedestrian will follow a trajectory which intersects with the driving route along which the vehicle is being navigated. In addition, the ANS can predict, based on the transmission of the targeted signal, that the pedestrian will follow a trajectory based at least in part upon the content of the signal, which can include following a trajectory which avoids the vehicle, and can further generate a driving route based on the prediction.

In some embodiments, the targeted signal includes a visual signal. For example, the targeted signal can be generated by one or more visual indicators, including one or more lights, included in the vehicle, where a particular set of visual indicators are activated to generate a particular visual signal. The visual indicators can include at least a portion of one or more headlight assemblies included in the vehicle, where a portion of the headlight assemblies can be adjusted to direct a light beam to a particular dynamic element in the environment. The headlight assemblies can be adjusted to provide a visual signal which includes a variable-intensity beam of light, including a series of light beam pulses, etc.

In some embodiments, a targeted signal includes an audio signal which is directed at a particular dynamic element, including a traffic participant, instance of fauna, etc. located in the external environment. The audio signal can be a directional signal which is focused in angle and axis via various known systems and methods of generating targeted audio signals, including one or more of beamforming, ultrasonic modulation, etc., so that the recipient of the audio signal is at least partially restricted to the target dynamic element to which the targeted signal is directed. As a result, the amplitude of the signal can be reduced, relative to a non-targeted audio signal, which can result in reduced disturbances to other dynamic elements in the external environment as a result of the signal transmission. In addition, as a result of the amplitude of the targeted signal being reduced relative to a non-targeted signal, information communicated to the dynamic element via content in the targeted signal can be at least partially precluded from being received and interpreted by other dynamic elements in the environment, thereby providing at least some level information security to the communication.

As referred to herein, a "driving route" includes a pathway along which a vehicle is navigated. A driving route can extend from a starting location to another separate destination location, extend back to a destination location which is the same as the starting location, etc. A route can extend along one or more various portions of one or more various roadways. For example, a route between a home location and a work location can extend from a home driveway, through one or more residential streets, along one or more portions of one or more avenues, highways, toll ways, etc., and to one or more parking spaces in one or more parking areas. Such routes can be routes which a user repeatedly navigates over time, including multiple times in a given day (e.g., routes between home and work locations may be travelled at least once in a given day).

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

FIG. 1 illustrates a schematic block diagram of a vehicle 100 which comprises an autonomous navigation system (ANS), according to some embodiments. Some or all of the ANS 110 illustrated in FIG. 1, including one or more of the modules 111, 112, 113, etc., can be included in any of the embodiments of ANSs included in any of the embodiments herein.

Vehicle 100 includes an autonomous navigation system ("ANS") 110, a set of one or more sensor devices 116, a set of one or more control elements 120, a set of one or more signal devices 117, and a set of one or more user interfaces 130. Sensor devices 116 include devices which monitor one or more aspects of an external environment in which the vehicle is located. Monitoring an aspect of an external environment can include generating, at the sensor device, sensor data which includes information regarding the aspect of the external environment. For example, a sensor device 116 can include one or more of a camera device which generates images of one or more portions of the external environment, a light beam scanning device which generates one or more point clouds of one or more portions of the external environments, a radar device which generates radar data associated with one or more portions of the external environment, etc. Aspects of an external environment which can be monitored include one or more static elements, dynamic elements, etc. included in the environment. For example, a sensor device 116 which includes a camera device can capture images of an external environment which includes images of static elements, including roadway lane boundary markers, roadway curbs, inanimate obstacles in the roadway, etc., images of dynamic elements including traffic participants, fauna, ambient environment conditions, weather, etc.

The control elements 120 included in vehicle 100 include various control elements, including actuators, motors, etc. which each control one or more components of the vehicle which cause the vehicle to be navigated through an external environment. For example, a control element 120 can include one or more of a braking assembly (also referred to herein interchangeably as a braking system) which applies braking pressure to one or more wheel assemblies of the vehicle to cause the vehicle to be decelerated, a throttle assembly which adjusts the acceleration of the vehicle 100 through an external environment, a steering assembly which adjusts one or more configurations of one or more wheel assemblies which causes the vehicle to be adjustably navigated in one or more various directions through the external environment, etc. A control element can execute one or more various adjustments to navigation of the vehicle based on receipt and execution of one or more various control commands at the control elements from one or more of a user interface 130, the ANS 110, etc.

The one or more user interfaces 130, also referred to herein interchangeably as input interfaces, can include one or more driving control interfaces with which an occupant of the vehicle 100 can interact, such that the driving control interfaces generate control commands which cause one or more control elements 120 to adjustably navigate the vehicle 100, based on one or more occupant interactions with one or more interfaces 140. In some embodiments, one or more input interfaces 140 included in the vehicle 100 provide one or more instances of information to occupants of the vehicle, including indications of whether the vehicle is being navigated via autonomous driving control of the vehicle 100 by ANS 110, whether the vehicle is being navigated to a stop based on implementation of a failure recovery plan at the ANS 110, whether at least one failure in the ANS 110 is determined to have occurred, etc.

Vehicle 100 includes at least one set of signal devices 117 which are coupled to various portions of an exterior of the vehicle 100 and are configured, individually, collectively, in limited part, etc. to generate one or more various targeted signals which are directed to one or more particular dynamic elements in the external environment. In some embodiments, one or more signal devices are configured to generate at least a portion of a targeted signal which communicates one or more instances of targeted information to the particular dynamic elements, where the one or more instances of targeted information are selected based at least in part upon one or more particular aspects of one or more of the vehicle 100, the one or more dynamic elements in the external environment, etc. For example, a targeted signal can communicate, to a particular target dynamic element, information which indicates a presence of the vehicle in the external environment. In another example, a targeted signal can communicate, to a particular target dynamic element, information which includes a message to the target dynamic element.

In some embodiments, a set of signal devices 117 included in a vehicle can generate and direct a targeted signal to a particular target dynamic element included in the external environment, so that the signal is directed through a limited portion of the external environment in which the particular target dynamic element is located and the dynamic elements which can perceive the targeted signal can be at least partially restricted to the dynamic elements, including the particular target dynamic element, which are located in the limited portion of the external environment through which the targeted signal is directed.

In some embodiments, a targeted signal generated by one or more sets of signal devices 117 includes an audio signal and one or more sets of signal devices 117 are configured to generate one or more targeted audio signals. For example, one or more signal devices 117 can include one or more sets of speaker devices. In some embodiments, one or more speaker devices can be adjustably positioned. The audio signal can include one or more of an audio indication, an audio message, a particular sound effect, some combination thereof, etc. The signal can be directed through a particular limited portion of the environment in which the target dynamic element is located via one or more of beamforming, ultrasonic modulation, etc. In some embodiments, vehicle 100 includes multiple audio signal devices 117 located at various portions of the exterior of the vehicle 100, and, to generate a targeted audio signal which is directed at a target dynamic element, a limited selection of the audio signals which are located on a portion of the vehicle 100 exterior and are at least partially oriented in a direction towards the target dynamic element can be commanded to collectively generate the target audio signal. One or more signal devices 117 can be adjustably positioned to cause the signal devices 117 to be directed towards the target dynamic element, which results in a signal generated by the signal devices to be directed towards the target dynamic element.

In some embodiments, a targeted signal generated by one or more sets of signal devices 117 includes a visual signal and one or more sets of signal devices 117 are configured to generate one or more targeted visual signals. For example, one or more signal devices 117 can include one or more sets of light generating devices, light indicators, light-emitting diodes (LEDs), headlight assemblies, etc. One or more sets of signal devices 117 which are configured to generate one or more targeted visual signals can be adjustably positioned, so that one or more sets of signal devices 117 can, individually, collectively, etc., be positioned to direct one or more light beams towards one or more target dynamic elements in the external environment.

A message included in a targeted signal can be a warning associated with one or more of the driving route along which the vehicle is being navigated, one or more trajectories via which the dynamic element can navigate through the environment, etc. For example, where a dynamic element includes a pedestrian that is walking along a sidewalk proximate to a vehicle 100 and in a particular orientation which precludes the vehicle 100 from being within a field of view of the pedestrian, a targeted signal generated by one or more signal devices 117 which is directed to the pedestrian can include an audio warning, to the pedestrian, to avoid turning into the roadway along which the vehicle is being navigated. The message can include a verbal, spoken message.

In some embodiments, one or more instances of personal data can be accessed by ANS 110. For example, in some embodiments, ANS 110 can process sensor data, generated by one or more sensor devices 116, and, based on personal data including facial recognition data, associated user device detection, etc., identify a dynamic element in the environment as an element associated with a particular individual, user account, etc. In some embodiments, the content included in a targeted signal generated at one or more signal devices 117 includes content generated based on one or more instances of personal data, including personal schedule data, identity data, etc. For example, where a dynamic element is identified at ANS 110 as being a particular individual, the ANS can generate a targeted signal which includes audio content which addresses the dynamic element by name.

Users can benefit from use of personal data by the ANS. For example, the personal data can be used to communicate relevant content to a particular individual identified in the external environment by the ANS. Accordingly, use of such personal data enables users to influence and control delivered content.

Users can selectively block use of, or access to, personal data. A system incorporating some or all of the technologies described herein can include hardware and/or software that prevents or blocks access to such personal data. For example, the system can allow users to "opt in" or "opt out" of participation in the collection of personal data or portions of portions thereof. Also, users can select not to provide location information, or permit provision of general location information (e.g., a geographic region or zone), but not precise location information.

Entities responsible for the collection, analysis, disclosure, transfer, storage, or other use of such personal data should comply with established privacy policies and/or practices. Such entities should safeguard and secure access to such personal data and ensure that others with access to the personal data also comply. Such entities should implement privacy policies and practices that meet or exceed industry or governmental requirements for maintaining the privacy and security of personal data. For example, an entity should collect users' personal data for legitimate and reasonable uses, and not share or sell the data outside of those legitimate uses. Such collection should occur only after receiving the users' informed consent. Furthermore, third parties can evaluate these entities to certify their adherence to established privacy policies and practices.

ANS 110 includes various modules 111, 112, 113 which can be implemented by one or more computer systems. ANS 110 autonomously navigates vehicle 100 along one or more driving routes, based at least in part upon sensor data generated by one or more sensor devices 116.

Driving control module 112 can determine a driving route based at least in part upon at least some sensor data generated by one or more sensor devices 116, including position data indicating a geographic position of the vehicle 100 and a world model, stored in one or more memory storage devices included in the vehicle 100, one or more remotely-located systems external to the vehicle 100, etc.

In some embodiments, the ANS 110 determines a driving route based at least in part upon occupant interaction with one or more interfaces 130 included in the vehicle 100, including one or more interactions which result in the ANS 110 receiving an occupant-initiated command to navigate the vehicle 100 from a particular location in the external environment, which can include a present location of the vehicle 100 in the external environment, to a particular destination location. In some embodiments, the occupant-initiated command includes a command to navigate the vehicle 100 along a particular occupant-selected driving route. In some embodiments, the ANS 110 receives a driving route from a remotely-located system via one or more communication networks.

In some embodiments, the module 112 generates one or more sets of control elements commands which are communicated to one or more control elements 120 in the vehicle 100 and cause the control elements 120 to navigate the vehicle 100 along a driving route. The module 112 can generate control commands based on a driving route, where the control commands, when executed by the control elements 120, cause the vehicle 100 to be navigated along the driving route.

ANS 110 includes an intention recognition module 111 which generates a driving route through a portion of an external environment based at least in part upon predicted trajectories of one or more dynamic elements, including one or more traffic participants, instances of fauna, pedestrians, etc., through at least a portion of the external environment. The module 111 can process sensor data, generated by one or more sensor devices 116, and, based on the processing, identify various static elements and dynamic elements in the external environment.

The module 111 can identify various features of the various static elements and dynamic elements. The various features are referred to herein as contextual cues and include object cues which are associated with observed aspects of a dynamic element and situational cues which are associated both the dynamic element and various aspects of the environment, including interactions between dynamic element and various elements in the environment, motions of the dynamic element with regard to various elements in the environment, etc. An object cue associated with a dynamic element can include one or more particular features associated with an appearance of one or more portions of a dynamic element detected via processing of sensor data, one or more particular features associated with various movements and actions of the dynamic element in the environment detected via processing of sensor data, etc. For example, where a pedestrian is detected, via sensor data processing, to be jogging along a sidewalk which extends adjacent to a roadway, object cues which can be identified via sensor data processing can include a type of clothing worn by the pedestrian, a rate of motion by the pedestrian along the sidewalk, an orientation of the pedestrian and direction of travel, a position, velocity, acceleration, etc. of the pedestrian with regard to one or more particular static elements, dynamic elements, etc. in the environment, an interaction by the pedestrian with one or more static elements, dynamic elements, etc. in the environment, etc. In another example, situational cues can include a present set of weather conditions in the environment in which the dynamic element is moving, a position, motion, etc. of the dynamic element relative to one or more particular static elements in the environment, including one or more particular structures, in the environment, etc.

Module 111 can predict a trajectory of a dynamic element, including a traffic participant, through the environment based on identifying various contextual cues associated with the dynamic element and correlating the identified cues with one or more sets of cues included in an association between the sets of cues and one or more particular dynamic element intentions. Correlating the identified cues with cues included in an association can include determining an at least partial match between the identified contextual cues and a set of cues included in the association, where an at least partial match can include a match between the sets of cues which exceeds a certain threshold level. Based on the correlation, module 111 can associate the identified cues with an intention included in the association.

Associating identified cues, associated with a dynamic element, with a particular intention can include associating the particular intention with the dynamic element. A dynamic element intention can include a set of specified actions, motions, etc. which the dynamic element is predicted to take, based on at least partial identification of a particular set of contextual cues associated with the dynamic element. Associating a set of identified contextual cues with a particular intention can result in a prediction, at module 111, that a dynamic element identified in the environment and associated with the intention will take the set of actions specified in the particular intention.

Based on associating a dynamic element with a particular intention, module 111 can generate a predicted trajectory of the dynamic element through the external environment, where the trajectory indicates a predicted position, velocity, acceleration, etc. of the dynamic element at various future times in the external environment. Based on the predicted trajectory of the dynamic element through the environment, module 111 can generate a driving route along which vehicle 100 can be navigated which results in the vehicle 100 avoiding intersection with the dynamic element navigation according to the predicted trajectory.

ANS 110 includes signaling module 113 which generates commands to various signal devices 117 which cause the various devices 117 to generate one or more targeted signals which are directed at target dynamic elements in the external environment. Generating commands at module 113 can include selecting particular target dynamic elements, determining a direction, the angle and axis of the signal transmission through the external environment, the information included in the signal, etc. Module 113 can select a targeted dynamic element determine to generate a targeted signal to the target dynamic element, determine the particular content to be communicated to the dynamic element via the targeted signal, etc. based on determinations at one or more of modules 111, 112 in ANS 110. For example, where module 111 identifies a dynamic element in the external environment which includes a pedestrian approaching the roadway, where the vehicle 100 is determined to be outside a field of view of the pedestrian, module 113 can, in response to the identification and determination at module 111 by determining to generate a targeted signal to the pedestrian, determining a particular axis and angle of the signal transmission which at least partially restricts the signal from being received by dynamic elements other than the pedestrian, selecting a set of devices 117 which can collectively generate a signal with the determined axis and angle, determining the content of the signal, and commanding the selected set of devices 117 to generate the targeted signal which includes the determined content and is transmitted along the determined axis and angle. In the above example, module 113 can determine that the content to include in the targeted signal includes an audio warning message, so that the module 113, in commanding a set of devices 117 to generate the targeted signal to the pedestrian, commands the devices 117 to generate a targeted audio signal which includes a particular warning message to the pedestrian regarding a risk of paths intersecting with the vehicle.

Figure 2:
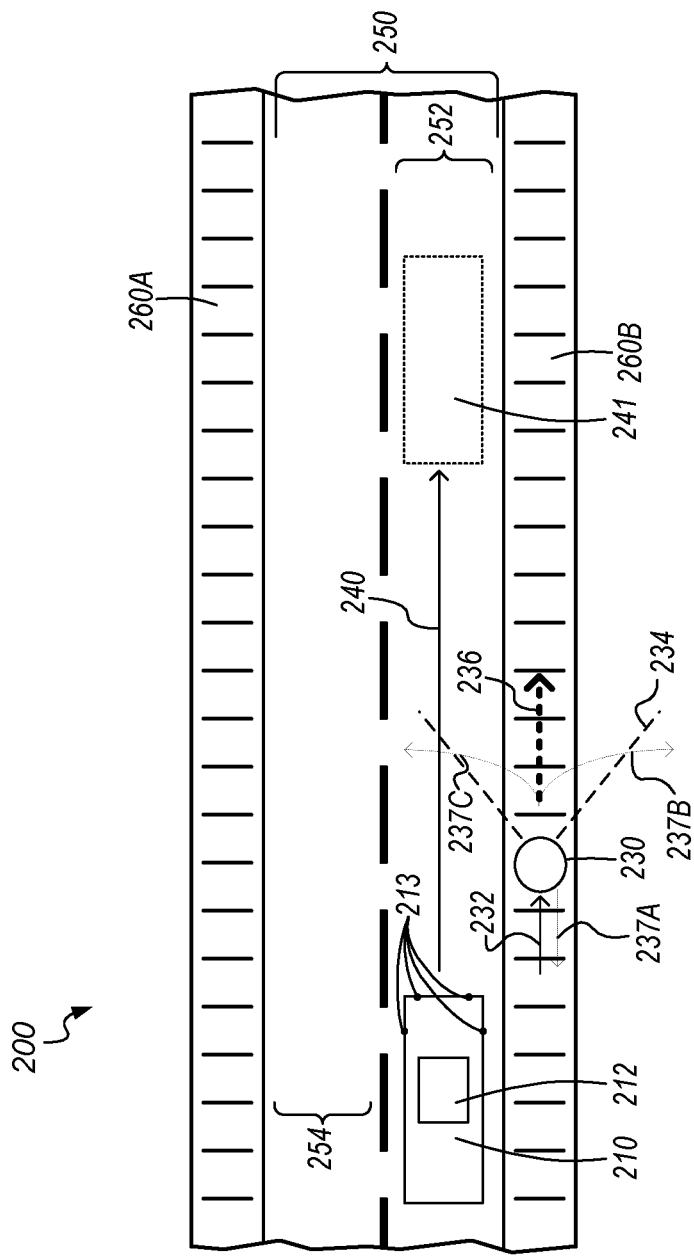
FIG. 2 illustrates an overhead view of an environment in which multiple dynamic elements are located, including a vehicle which is autonomously navigated through the environment and includes a set of sensors which can generate sensor data associated with the dynamic elements and an autonomous navigation system which can determine a particular predicted trajectory of a dynamic element based on contextual cues identified in the sensor data, according to some embodiments.

FIG. 2 illustrates an overhead view of an environment in which multiple dynamic elements are located, including a vehicle which is autonomously navigated through the environment and includes a set of sensors which can generate sensor data associated with the dynamic elements and an autonomous navigation system which can determine a particular predicted trajectory of a dynamic element based on contextual cues identified in the sensor data, according to some embodiments. Vehicle 210 can include any of the embodiments of vehicles included herein, and ANS 212 can include any of the embodiments of ANSs included herein.

In some embodiments, an ANS included in a vehicle processes sensor data, generated by various sensor devices included in the vehicle, and identifies at least one particular dynamic element included in the environment. For example, in the illustrated embodiment, where vehicle 210 is located in an external environment 200 which includes a roadway 250 with lanes 252, 254 and sidewalks 260A-B extending alongside the roadway 250, sensor devices 213 included in the vehicle 210 can generate sensor data which can be processed by the ANS 212 so that the ANS, as a result, determines that the vehicle 210 is located in lane 252 of the roadway 250 and that a dynamic element 230, which can include a pedestrian, is located at a particular position on the sidewalk 260B and is moving at a particular velocity 232 along the sidewalk 260B.

In some embodiments, an ANS included in a vehicle determines various features of a dynamic element and the external environments in which a dynamic element is located. The ANS can associate these features, referred to as dynamic element contextual cues, with the dynamic element. For example, in the illustrated embodiment shown in FIG. 2, ANS 212, based on processing data generated by sensors 213, can identify contextual cues including a cue indicating that a dynamic element 230 is located in environment 200 at a certain time of day, a cue indicating that a dynamic element 230 is located in a particular type of environment (e.g., rural, urban, residential area, industrial area, etc.), a proximity of various specific structures (e.g., schools, landmarks, etc.) to the element 230, a geographic position of the element 230 relative to various static elements, dynamic elements, etc. located in the environment 200, etc. In one example, the contextual cues which can be identified by the ANS 212 and associated with element 230 can include an identification that element 230 is remotely located from any crosswalks, bridges, etc. via which the dynamic element 230 might travel across the roadway 250. In another example, ANS 212 can identify a cue that the element 230 is moving through an environment 200 which is a rural environment, etc.

ANS 212 can determine, based on processing sensor data associated with the dynamic element 230, contextual cues associated with element 230 which indicate one or more of a visual appearance of the dynamic element 230, a type of traffic participant of the dynamic element 230, etc. For example, ANS 212 can identify cues associated with element 230, based on processing sensor data generated by one or more sensors 213, that indicate that element 230 is a pedestrian and that the pedestrian 230 is wearing a particular type of clothing, including a set of clothing associated with exercise. Such determination can include utilizing captured images of the dynamic element 230 and comparing an appearance of the element 230 with representations of various particular articles of clothing. In another example, ANS 212 can identify a cue which indicates that element 230 is a pedestrian who is utilizing a wheelchair for mobility.

In some embodiments, where the dynamic element 230 is a traffic participant, including a pedestrian, vehicle, etc. the ANS 212 can process sensor data associated with the traffic participant and determine, based on the processing, a cue which indicates a field of view of the traffic participant. As shown, ANS 212 can determine that a present field of view of the dynamic element 230 is as shown at 234. ANS 212 can identify, as a contextual cue, that the field of view 234 is approximately centered on the sidewalk 260B along which the dynamic element 230 is moving 232. The ANS can identify, as a contextual cue, that the dynamic element 230 is moving along a particular velocity 232 and acceleration.

The ANS can associate identified contextual cues with the dynamic element 230, based on an association of the cues with monitoring the dynamic element. For example, a contextual cue indicating an appearance of a dynamic element 230 can be associated with that element 230 based on the cue being identified based on monitoring the appearance of the dynamic element, and a contextual cue indicating that a dynamic element 230 is moving through a particular type of environment can be associated with the element 230 based on the cue being identified based at least in part upon monitoring the motion of the element 230 through one or more external environments.

Based on the identified contextual cues associated with a dynamic element, ANS 212 can determine a correlation between at least some of the identified contextual cues with a set of contextual cues which are associated with a particular dynamic element intention. Based on determining the correlation, the ANS 212 can associate the dynamic element 230 with the particular dynamic element intention and can generate a predicted trajectory of the dynamic element 230 based on the associated particular dynamic element intention.

In the illustrated embodiment, ANS can determine that the identified contextual cues associated with the dynamic element 230 correlate with a set of contextual cues associated with a particular dynamic element intention, where the particular intention specifies that the dynamic element is predicted to continue moving along the sidewalk on which it is presently moving. ANS 212 can associate the particular intention with dynamic element 230 and generate a predicted trajectory 236 of the dynamic element 230 based on the particular intention associated with the dynamic element 230. In some embodiments, ANS 212 can generate various different predicted trajectories 237A-C of the dynamic element 230 based on different contextual cues identified in association with both the dynamic element 230 and the environment 200, different intentions which correlate to the identified cues, etc.

As shown, ANS 212 generates a driving route 240 along which vehicle 210 is navigated to at least position 241 based at least in part upon the predicted trajectory 236 of the dynamic element 230. Because the predicted trajectory 236 continues along sidewalk 260B, the ANS 212 generates a route 240 which continues along lane 252 without substantial deviation in direction, velocity, etc. In another example, where the predicted trajectory of element 230 is determined to be trajectory 237C which veers from sidewalk 260B into the roadway lane 252 along which vehicle 210 is presently moving, the ANS 212 can generate a different driving route which navigates the vehicle 210 to avoid intersecting with trajectory 237C, including a route via which vehicle 210 is decelerated, navigates at least partially out of lane 252, some combination thereof, etc.

Figure 3:
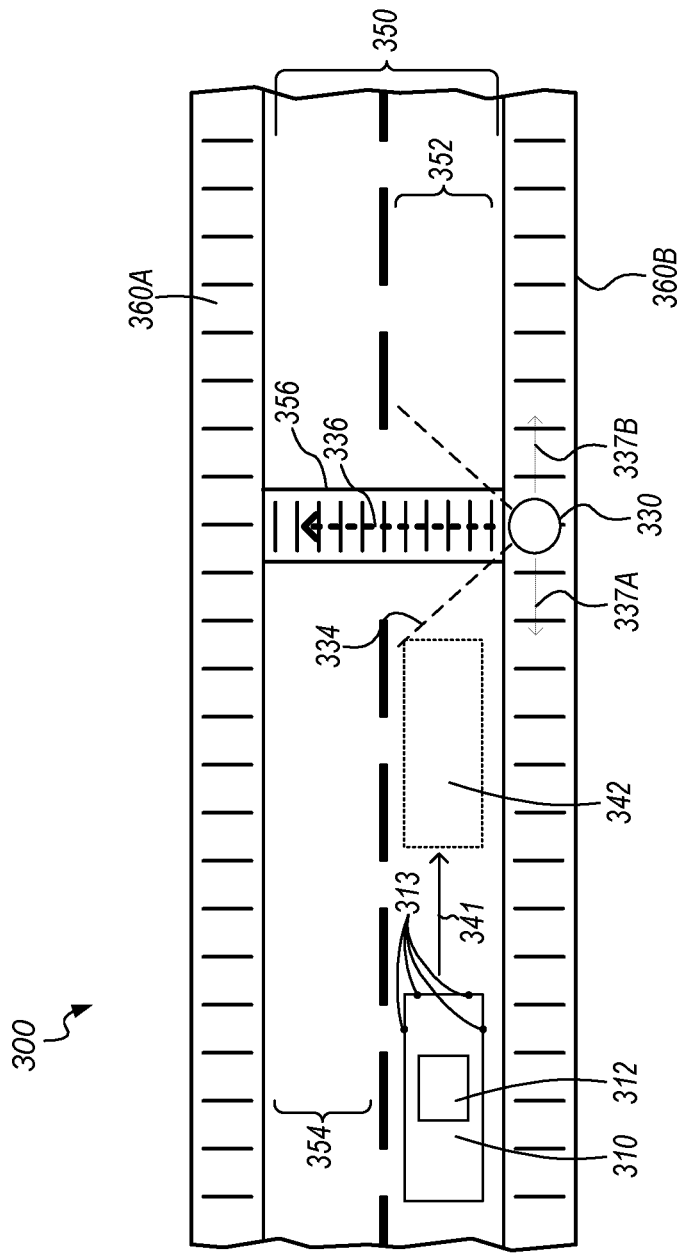
FIG. 3 illustrates an overhead view of an environment in which multiple dynamic elements are located, including a vehicle which is autonomously navigated through the environment and includes a set of sensors which can generate sensor data associated with the dynamic elements and an autonomous navigation system which can determine a particular predicted trajectory of a dynamic element based on contextual cues identified in the sensor data, according to some embodiments.

FIG. 3 illustrates an overhead view of an environment in which multiple dynamic elements are located, including a vehicle which is autonomously navigated through the environment and includes a set of sensors which can generate sensor data associated with the dynamic elements and an autonomous navigation system which can determine a particular predicted trajectory of a dynamic element based on contextual cues identified in the sensor data, according to some embodiments. Vehicle 310 can include any of the embodiments of vehicles included herein, and ANS 312 can include any of the embodiments of ANSs included herein.

In the illustrated embodiment, where vehicle 310 is located in an external environment 300 which includes a roadway 350 with lanes 352, 354 and sidewalks 360A-B extending alongside the roadway 350, sensor devices 313 included in the vehicle 310 can generate sensor data which can be processed by the ANS 312 so that the ANS, as a result, determines that the vehicle 310 is located in lane 352 of the roadway 350 and that a dynamic element 330, which can include a pedestrian, is located at a particular position on the sidewalk 360B.

The ANS 312 can identify, as environmental contextual cues associated with environment 300 based on processing data generated by sensors 313, that environment 300 includes sidewalks 360A-B on opposite adjacent sides of roadway 350 and that a crosswalk 356 extends across the roadway 350 between the sidewalks 360A-B.

The ANS 312 can further identify dynamic element contextual cues associated with the dynamic element 330 which indicate that the dynamic element is positioned at a stop, that the dynamic element is positioned proximate to the sidewalk 356 across the roadway 350, and that the dynamic element 330 has a field of view 334 which includes the crosswalk 356 and does not include sidewalk 360 on which dynamic element 330 is located.

ANS 312 can determine that the set of identified dynamic element cues associated with element 330 correlate with a set of contextual cues included in a particular intention association. Determining a correlation between the contextual cues can include determining that the set of identified contextual cues at least partially matches the set of contextual cues included in the association. The ANS 312 can determine that the association includes an association of the set of contextual cues with a particular dynamic element intention which specifies that, although the dynamic element is presently stationary, the dynamic element is predicted to move onto the crosswalk and across the roadway via the crosswalk.

Based on associating the dynamic element 330 with a particular dynamic element intention which specifies that, although the dynamic element is presently stationary, the dynamic element is predicted to move onto the crosswalk and across the roadway via the crosswalk, ANS 312 can generate a predicted trajectory 336 of the dynamic element 330 through the environment 300, where the predicted trajectory 336 of the dynamic element 330 passes along crosswalk 356 and across roadway 350, according to the particular dynamic element intention associated with the dynamic element 330.

In some embodiments, ANS 312, in generating a predicted trajectory of a dynamic element through an environment, selects one of a set of predicted trajectories based on a particular dynamic element intention associated with the dynamic element. A set of trajectories can be associated with a dynamic element based on a dynamic element type associated with the dynamic element. For example, in the illustrated embodiment, a set of trajectories 336, 337A-B can be associated with dynamic element 330 based on dynamic element 330 being a pedestrian, and ANS 312 can select trajectory 336 as the predicted trajectory of dynamic element 330, rather than one of trajectories 337A-B, based on determining a correlation between the trajectory 336 and the particular dynamic element intention which is associated with the dynamic element 330.

ANS 312 can generate a driving route 341 along which vehicle 310 is navigated based at least in part upon the predicted trajectory 336 of the dynamic element 330 through the environment 300. The driving route can be configured to navigate the vehicle 310 in avoidance of an intersection with the predicted trajectory of the dynamic element 330. In the illustrated to embodiment, ANS 312 generates a driving route 341 which, when vehicle 310 is navigated along the route 341, results in the vehicle being decelerated to a position 342 concurrently with the predicted position of dynamic element 330 being at one or more positions along trajectory 336 which is located on a portion of crosswalk 356 which is within lane 352.

In some embodiments, route 341 is configured to navigate the vehicle 310 along a pathway which intersects a portion of the trajectory 336 subsequently to the dynamic element travelling through the portion of the trajectory 336, so that the vehicle 310 navigates "behind" the dynamic element 330 as it navigates through the environment 300. For example, ANS 312 can generate a route 341, based on the predicted trajectory 336, which includes decelerating vehicle 310 to a position 342 for a period of time and subsequently accelerating the vehicle, along lane 352, across the pathway of trajectory 336, based on a determination that dynamic element 330 has moved along trajectory 330 out of lane 352 and into at least lane 354.

In some embodiments, ANS is configured to continue monitoring various aspects of the environment 300, including movement of the dynamic element 330 through the environment 300, subsequent to generating the predicted trajectory 336 of the element 330 and generating a driving route 341 of the vehicle 310 based thereupon. The ANS 312 can determine whether the dynamic element 330 is moving along the predicted trajectory 336. In some embodiments, ANS 312 responds to a determination that the dynamic element 330 is following a different trajectory than the predicted trajectory by revising the driving route 341 via which vehicle 310 is navigated through the environment. ANS 312 can revise the association between the identified contextual cues associated with the dynamic element 330 and the environment 300 with a particular intention based on determining that the dynamic element moves along a trajectory which is separate from a predicted trajectory generated based on the particular intention. Such a revision of the association can include adjusting a confidence level associated with the association, adjusting the particular intention to specify a different set of predicted dynamic element movements, some combination thereof, etc.

Figure 4:
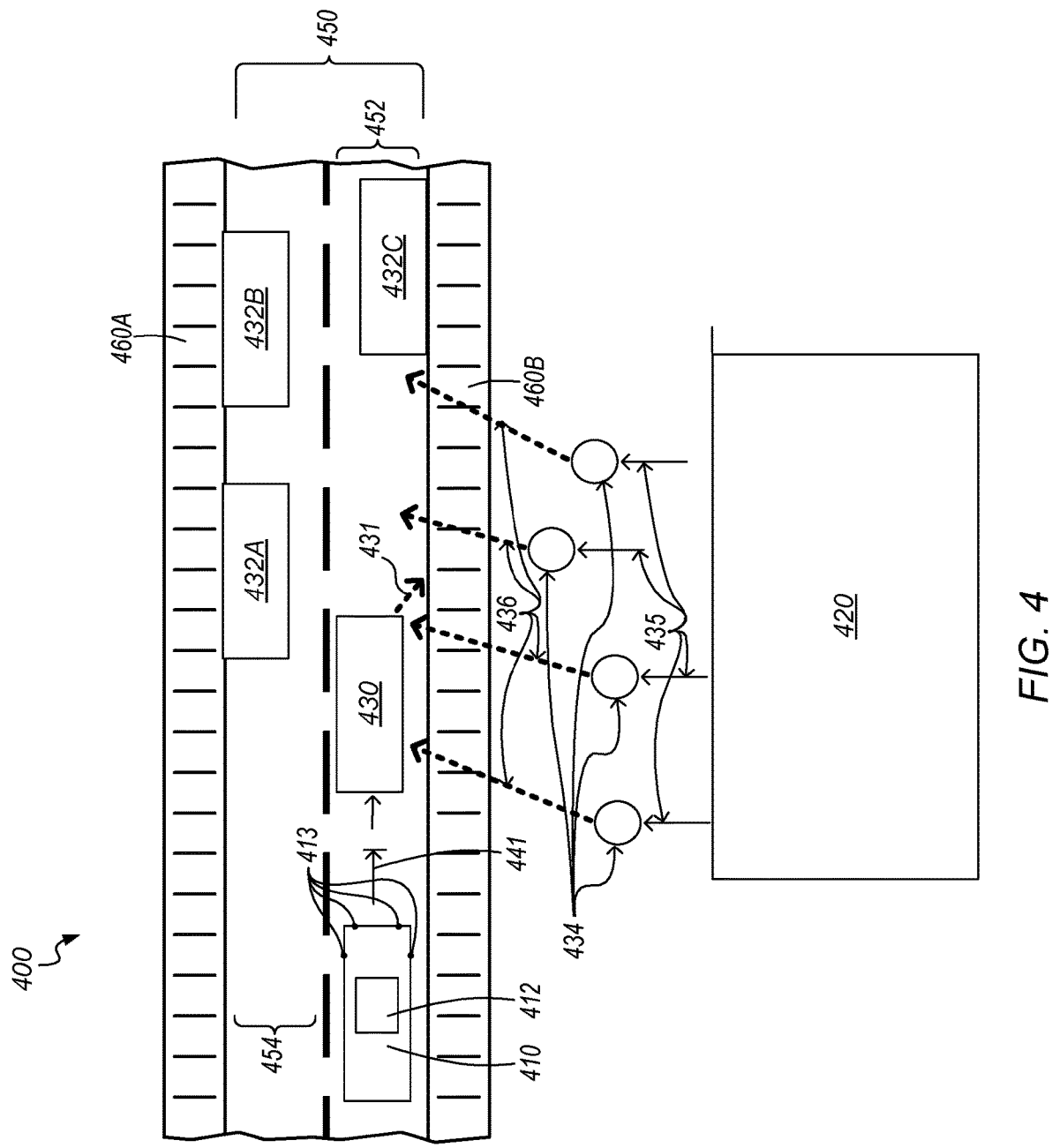
FIG. 4 illustrates an overhead view of an environment in which multiple dynamic elements are located, including a vehicle which is autonomously navigated through the environment and includes a set of sensors which can generate sensor data associated with the dynamic elements and an autonomous navigation system which can determine a particular predicted trajectory of a dynamic element based on contextual cues identified in the sensor data, according to some embodiments.

FIG. 4 illustrates an overhead view of an environment in which multiple dynamic elements are located, including a vehicle which is autonomously navigated through the environment and includes a set of sensors which can generate sensor data associated with the dynamic elements and an autonomous navigation system which can determine a particular predicted trajectory of a dynamic element based on contextual cues identified in the sensor data, according to some embodiments. Vehicle 410 can include any of the embodiments of vehicles included herein, and ANS 412 can include any of the embodiments of ANSs included herein.

In the illustrated embodiment, where vehicle 410 is located in an external environment 400 which includes a roadway 450 with lanes 452, 452 and sidewalks 460-B extending alongside the roadway 450, sensor devices 413 included in the vehicle 410 can generate sensor data which can be processed by the ANS 412 so that the ANS, as a result, determines that the vehicle 410 is located in lane 452 of the roadway 450. The ANS 412 further determines that static element 420 and dynamic elements 430, 432A-C, and 434 are located in the environment 400. Dynamic elements 430, 432A-C can include traffic participants which include vehicles located on at least a portion of roadway 450. Dynamic elements 434 can include pedestrians. Static element 420 can include a particular structure.

The ANS 412 can identify, as contextual cues associated with one or more of elements 430, 432, 434 based on processing data generated by sensors 413, that the dynamic elements are located proximate to a static element 420 which is a particular structure. For example, the ANS 412 can identify that structure 420 is a school building and that elements 434, 430, 432 are located proximate to the school building. In some embodiments, ANS 412 can identify a contextual cue that the vehicle 410 and elements 430, 432, 434 are located in a school zone, based at least in part upon determining that the present geographic position of the vehicle and dynamic elements, determined based on processing sensor data generated by a sensor device 413, correlates with a determined geographic location associated with a school zone located in the environment 400, a particular school zone, some combination thereof, etc. The geographic location associated with a school zone, a particular school zone, some combination thereof, etc. can be determined based on information received from a service, system, etc. which is located remotely from the vehicle 410, where the information is received at vehicle 410 via one or more communication networks. The ANS 412 can identify a contextual cue that indicates that one or more of the vehicle 410, elements 430, 432, 434, etc. are located in a school zone based at least in part upon determining, based on processing sensor data, that static element 420 is a school structure associated with a school zone and that one or more of vehicle 410, dynamic elements 430, 432, 434, etc. is located within a certain threshold distance from the static element 420.

In some embodiments, the ANS 412 can identify, as a contextual cue associated with one or more of the dynamic elements 430, 432, 434, etc. based on processing data generated by sensors 413, that the one or more dynamic elements are located in environment 400, within a certain proximity of the school 420, at a time which is included within a particular time period during which classes at the school 420 are dismissed. The identification can be based on determining a present time, determining a set of events associated with the identified school 420, where at least one event includes class dismissal, comparing the present time with a time period associated with the class dismissal event, and determining that the present time is located within the time period associated with the class dismissal event.

ANS 412, based on processing sensor data generated by sensors 413, can identify contextual cues associated with at least elements 432 which indicate that dynamic elements 432A-C are vehicles which are stopped proximate to respective sides of the roadway 450, also referred to herein as being "pulled-over" to the sides of the roadway 450, and can further identify contextual cues associated with at least elements 424 which indicate that dynamic elements 434, which include pedestrians, are moving 435 in a general direction away from the static element 420 which is identified as a school building and towards the roadway 450. ANS 412 can identify contextual cues associated with each of the dynamic elements 434 which include identifying the dynamic elements 434 as children.

In some embodiments, dynamic element cues associated with one or more particular dynamic elements in an environment are associated with one or more other separate dynamic elements in the environment. For example, ANS 412 can associate the dynamic element cues identified based on monitoring the vehicle dynamic elements 430, 432A-C with the dynamic elements 434 and can further associate the dynamic elements cues identified based on monitoring the children dynamic elements 434 with the dynamic elements 430, 432A-C.

Based on identifying the various contextual cues associated with the various dynamic elements in the environment 400, ANS 412 can correlate the cues associated with one or more dynamic elements with one or more sets of contextual cues included in a particular intention association which associates the one or more sets of contextual cues with one or more particular dynamic element intentions. In the illustrated embodiment, ANS 412 can associate each of the vehicles 432A-C with a particular dynamic element intention which specifies that the dynamic elements are predicted to remain stopped at the sides of the roadway 450, based on matching at least a portion of the dynamic element cues associated with the elements 432A-C with a set of contextual cues which are themselves associated with the particular dynamic element intention. Based on associating each of the vehicles 432A-C with a particular dynamic element intention which specifies that the dynamic elements are predicted to remain stopped at the sides of the roadway 450, ANS 412 generates a predicted trajectory for each of the vehicles 432A-C which includes the vehicles 432A-C remaining stationary for at least a period of time, as shown in FIG. 4.

In addition, ANS 412 can associate vehicle 430 with a particular dynamic element intention which specifies that the dynamic element is predicted to pull over to the side of the roadway and stop, based on matching at least a portion of the dynamic element cues associated with the elements 430 with a set of contextual cues which are themselves associated with the particular dynamic element intention. ANS 412 can, based on the intention associated with the vehicle 430, generate a predicted trajectory 431 for the vehicle 430 which passes to the side of the roadway and stops, as shown in FIG. 4.

In some embodiments, a contextual cue associated with a dynamic element indicates movements of the dynamic element relative to movements of other dynamic elements in the environment. As a result of identifying cues which incorporate movements of various other dynamic elements in the environment, ANS 412 can associate a given dynamic element with an intention which more accurately predicts future movements of the dynamic element through the environment than via generating cues which incorporate movement of the given dynamic element alone. For example, in the illustrated embodiment, ANS 412, based on identifying that the vehicle 430 is moving slowly along lane 452 in a school zone during a time of day during which classes are dismissed from school 420 proximate to vehicle 430 without incorporating motions and positions of children 434 and vehicles 432A-C in the environment 400, ANS 412 may associate vehicle 430 with a different intention which specifies that the vehicle 430 is predicted to continue moving along lane 452, rather than pull over to the side of roadway 450.

In addition, ANS 412 can associate dynamic elements 434 with a particular dynamic element intention which specifies that the dynamic elements 434 are predicted to continue moving into the roadway 450 towards proximate stopped vehicles 432, based on matching at least a portion of the dynamic element cues associated with elements 434 with a set of contextual cues which are themselves associated with the particular dynamic element intention. As a result, ANS 412 can generate predicted trajectories 436 of the elements 434 which pass towards the vehicles 430, 432A-C and across sidewalk 460B and into the roadway 450. In some embodiments, ANS 412 identifies contextual cues associated with dynamic elements 434 which indicate movement of the elements 434 relative to particular movements of one or more additional dynamic elements through the environment 400.

In some embodiments, an ANS generates a driving route configured to navigate the vehicle along a pathway which avoids intersection of the vehicle with predicted trajectories of multiple dynamic elements in an environment. As shown, ANS 412 generates a driving route 441, based on predicted trajectories 431, 436 of dynamic elements 430, 434, which decelerates vehicle 410 so that, as a result, the vehicle 410 avoids intersections with trajectories 431, 436 at more than a particular threshold rate of speed. The ANS 412 can further control navigation of the vehicle 410 along the route to avoid paths intersecting with the various dynamic elements 434, 430, 432 included in the environment in response to deviations of the dynamic elements from the predicted trajectories of the dynamic elements.

Figure 5:
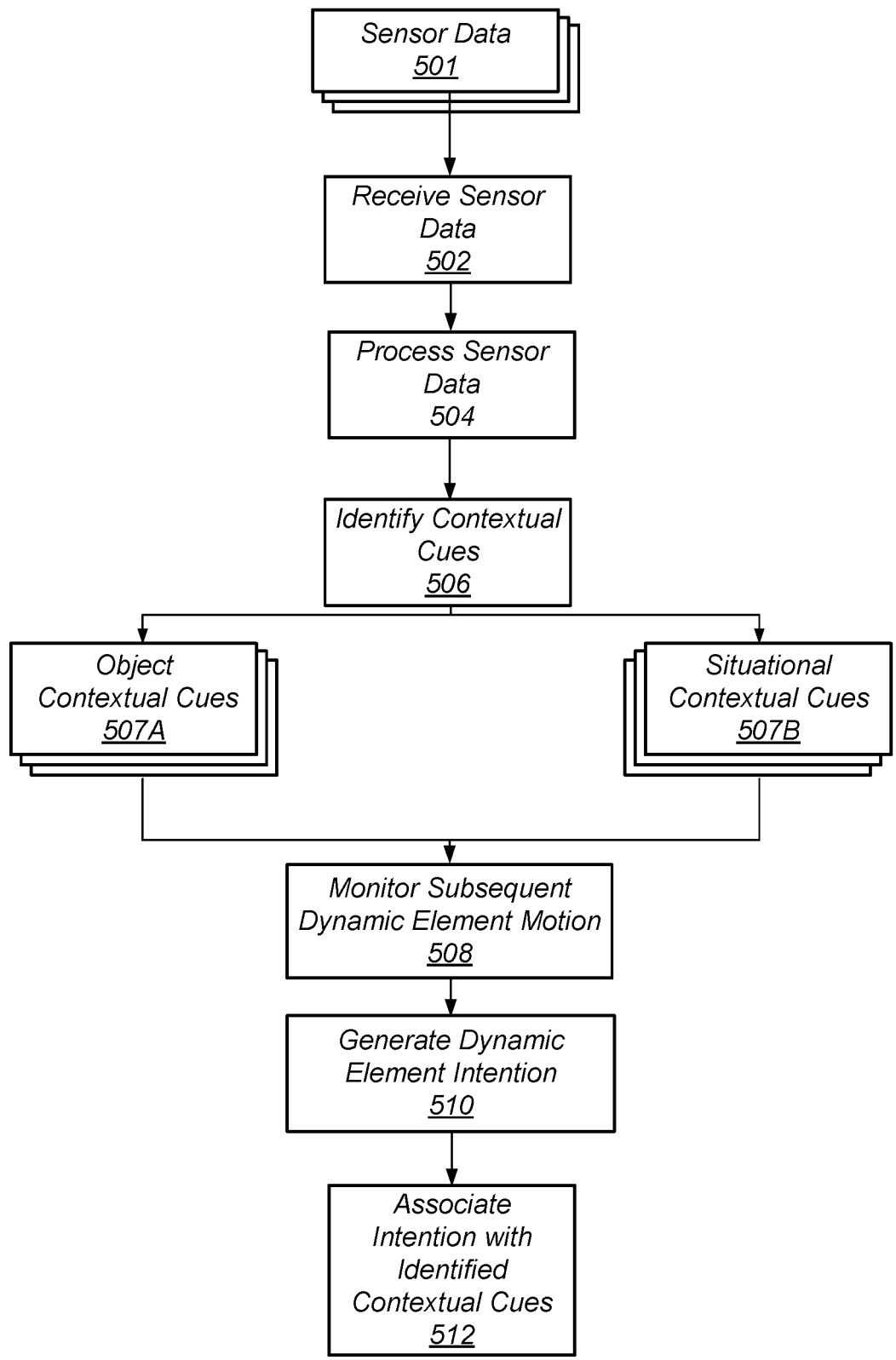
FIG. 5 illustrates generating an intention association between identified contextual cues and subsequent predicted dynamic element movements, according to some embodiments.

FIG. 5 illustrates generating an intention association between identified contextual cues and subsequent predicted dynamic element movements, according to some embodiments. The generating can be implemented by one or more portions of any embodiment of ANS included in any embodiments herein. An ANS can be implemented by one or more computer systems.

At 502, one or more instances of sensor data 501 are received from one or more sensor devices included in a vehicle. Sensor data can include various instances of information regarding one or more portions of an external environment in which the vehicle is located. For example, sensor data generated by a sensor device can include images, of at least a portion of an external environment, generated by a camera device, a point cloud, of a portion of an external environment, generated by a light beam scanning device, a radar image of an environment generated by a radar device, position information generated by a geographic positioning sensor device, weather data generated by one or more weather sensor devices, ambient light data generated by one or more ambient light sensors, time data generated by one or more chronometers, etc.

At 504, received sensor data is processed. Processing sensor data can include identifying various static elements, dynamic elements, some combination thereof, etc. included in the external environment. For example, where an external environment in which a vehicle is located includes a roadway on which the vehicle is located, a building proximate to the roadway processing sensor data generated by sensor devices included in the vehicle can include identifying the building as a particular static element in the environment, where the identification can include determining a particular position of the building in the environment, a particular distance between the building and the vehicle, a particular type of static element associated with the building, etc. In another example, where the external environment in which the vehicle is located a pedestrian standing ahead of the vehicle adjacent to the roadway, processing sensor data generated by sensor devices included in the vehicle can include identifying the pedestrian as a particular dynamic element in the environment, where the identification can include determining a particular position of the pedestrian in the environment, a particular orientation of the pedestrian, determining a particular present velocity, acceleration, etc. of the pedestrian, etc.

At 506, one or more contextual cues associated with one or more of the dynamic elements are identified based on processing sensor data at 504. Identifying a contextual cue from processing sensor data of a particular dynamic element, static element, etc. can include associating the identified contextual cue with one or more particular dynamic elements. As a result, the identifying at 506 can result in identifying various dynamic element object contextual cues 507A and situational contextual cues 507B associated with various dynamic elements in the environment.

Contextual cues identified and associated with an element in an environment can include "object contextual cues" 507A which are identified based on processing sensor data generated based on monitoring one or more features of the element and "situational contextual cues" which are identified based on processing sensor data generated based on monitoring the element relative to one or more elements of the environment, including motions, positions, orientations, etc. of the element relative to one or more aspects of one or more dynamic elements located in the environment, one or more aspects of one or more static elements located in the environment, one or more aspects of the environment in general, some combination thereof, etc.

For, example, where a vehicle is moving along a roadway, and where a dynamic element which includes a pedestrian is moving along a sidewalk which extends adjacent to the roadway, identifying 506 object contextual cues 507A associated with the pedestrian can include identifying object contextual cues which can include a cue indicating that the pedestrian is clothed in running exercise-related attire, a cue indicating that the pedestrian is wearing audio headset gear, etc. Identifying 506 contextual cues 507B associated with the pedestrian can include identifying situational contextual cues which include a cue indicating that the pedestrian is moving along a sidewalk with a general direction of travel which extends along in the sidewalk, a cue indicating that the pedestrian is moving along the sidewalk within a certain threshold velocity associated with jogging activities, a cue indicating that a field of view of the pedestrian includes the sidewalk and general direction of pedestrian travel, etc.

In another example, where a vehicle is moving along a roadway which extends proximate to a static element which includes a school building, and dynamic elements in the environment include a vehicle parked at the side of the road proximate to the school building and a child which is moving from the school building towards the roadway, identifying 506 contextual cues 507B associated with the child can include identifying situational contextual cues which can include a cue indicating that the child is proximate to a static element which is a portion of a particular school, a cue indicating that the child is moving away from the static element which is part of a particular school towards the roadway, and a cue indicating that the child is located proximate to the particular school at a time is within a time period associated with class dismissal at the particular school. Identifying 506 contextual cues 507A associated with the dynamic element which includes the child can include an object contextual cue indicating that the dynamic element is a child, an object contextual cue indicating that the child is wearing a backpack.

At 508, subsequent dynamic element motion is monitored via processing sensor data 501 generated by one or more sensor devices. For example, where the vehicle is moving along the roadway where a pedestrian is moving along an adjacent sidewalk, the monitoring at 508 includes monitoring subsequent motions of the pedestrian subsequent to identifying the various contextual cues at 506.

At 510, based on monitoring the subsequent dynamic element motion at 508, a dynamic element intention is generated, where the intention specifies occurrence of the motion of the dynamic element, monitored at 508, subsequent to identification, at 506, of the contextual cues associated with the dynamic element. For example, where a pedestrian is monitored, at 508, to continue moving along a sidewalk subsequent to identification of cues at 506 which indicate that the pedestrian is moving within a velocity window associated with jogging activities, is wearing jogging attire, has a field of view which includes the sidewalk and the direction of travel, etc., an intention generated at 510 can specify that the pedestrian is predicted to continue moving along the sidewalk subsequent to identifying the cues identified at 506.

In another example, where a child is monitored, at 508, to continue moving away from a school structure and out into a roadway, subsequent to identification of cues indicating that the dynamic element is a child, that the child is wearing a backpack, that the child is moving away from a school, that the child is moving away from the school at a time which is within a time period associated with class dismissal at a school, that the child is moving towards a roadway, some combination thereof, etc., an intention can be generated which specifies that the child is predicted to move into the roadway subsequent to identification of the cues at 506.

At 512, the intention generated at 512 is associated with at least some of the particular cues, identified at 506, which are associated with the dynamic element and upon which the intention is based. As a result, identifying some or all of the particular cues associated with another dynamic element at a future point in time can result in a correlation of the other dynamic element with the associated dynamic element intention.

Figure 6:
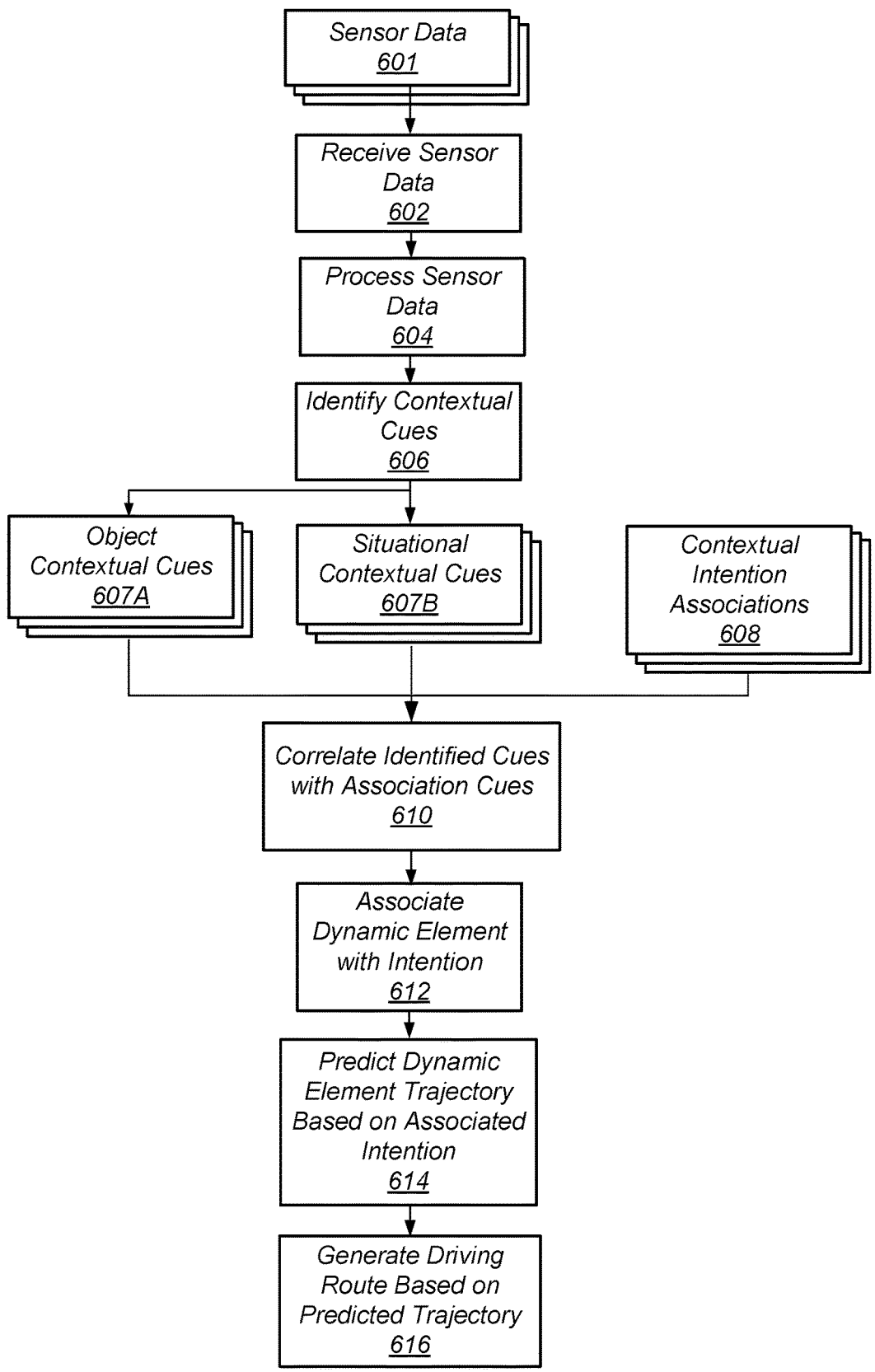
FIG. 6 illustrates autonomously navigating a vehicle through an external environment based on a predicted trajectory of a dynamic element in the external environment, according to some embodiments.

FIG. 6 illustrates autonomously navigating a vehicle through an external environment based on a predicted trajectory of a dynamic element in the external environment, according to some embodiments. The generating can be implemented by one or more portions of any embodiment of ANS included in any embodiments herein. An ANS can be implemented by one or more computer systems.

At 602, one or more instances of sensor data 601 are received from one or more sensor devices included in a vehicle. Sensor data can include various instances of information regarding one or more portions of an external environment in which the vehicle is located. For example, sensor data generated by a sensor device can include images, of at least a portion of an external environment, generated by a camera device, a point cloud, of a portion of an external environment, generated by a light beam scanning device, a radar image of an environment generated by a radar device, position information generated by a geographic positioning sensor device, weather data generated by one or more weather sensor devices, ambient light data generated by one or more ambient light sensors, time data generated by one or more chronometers, etc.

At 604, received sensor data is processed. Processing sensor data can include identifying various static elements, dynamic elements, some combination thereof, etc. included in the external environment. For example, where an external environment in which a vehicle is located includes a roadway on which the vehicle is located, a building proximate to the roadway processing sensor data generated by sensor devices included in the vehicle can include identifying the building as a particular static element in the environment, where the identification can include determining a particular position of the building in the environment, a particular distance between the building and the vehicle, a particular type of static element associated with the building, etc. In another example, where the external environment in which the vehicle is located a pedestrian standing ahead of the vehicle adjacent to the roadway, processing sensor data generated by sensor devices included in the vehicle can include identifying the pedestrian as a particular dynamic element in the environment, where the identification can include determining a particular position of the pedestrian in the environment, a particular orientation of the pedestrian, determining a particular present velocity, acceleration, etc. of the pedestrian, etc.

At 606, one or more contextual cues associated with one or more of the dynamic elements located in the environment are identified based on processing sensor data at 604. Identifying a contextual cue from processing sensor data of a particular dynamic element, static element, etc. can include associating the identified contextual cue with the particular dynamic element. As a result, the identifying at 606 can result in identifying various dynamic element contextual cues which include object contextual cues 607A and situational contextual cues 607B associated with one or more various dynamic elements in the environment.

At 610, at least some of the identified contextual cues 607A, 607B associated with a dynamic element in the environment are compared to contextual cues included in one or more various contextual intention associations 608, which can result in determining a correlation between at least some of the cues 607A-B with a set of contextual cues included in at least one particular association 608. Determining a correlation between at least some cues 607A-B identified at 606 with a set of cues included in an association, also referred to herein as determining that at least some cues 607A-B identified at 606 correlate with a set of cues included in an association, can include at least partially matching the cues 607A-B with the set of cues included in the association above a certain threshold level. For example, matching five of the identified cues 607A-B associated with a dynamic element with five cues out of a set of six cues included in a particular association 608 can result in a determination of a correlation of the five identified cues 607A-B with the particular association 608. An association 608 includes a set of contextual cues associated with one or more dynamic elements and a corresponding dynamic element intention, associated with the set of contextual cues, which specifies a prediction of the motion of the one or more dynamic elements through the environment based on the set of contextual cues.

At 612, based on correlating at least some identified cues 607A-B associated with a dynamic element in the environment with a particular association 608, the dynamic element is associated with a dynamic element intention included in the particular association 608. As a result, the intention included in the particular association 608 is determined to be a prediction of the motion of the dynamic element through the environment, based on the at least some identified cues 607A-B.

At 614, a trajectory of the dynamic element through the environment is determined, based at least in part upon the dynamic element intention associated with the dynamic element at 612. The trajectory can specify a particular variation of one or more of the position, velocity, acceleration, etc. of the dynamic element through the environment based on time. As a result, the generated trajectory can illustrate a prediction of the route along which the dynamic element is predicted to move through the environment and the various points in the environment at which the dynamic element is predicted to be located, along the route, at various points in time.

At 616, a driving route of the vehicle through the environment is generated based at least in part upon the predicted trajectory of the dynamic element through the environment. The driving route can be a trajectory of the vehicle which avoids intersection with one or more predicted trajectories of one or more dynamic elements through the environment where the vehicle and the one or more dynamic elements are located within a particular threshold proximity distance at one or more given points in time. A driving route can be a route through the environment which avoids navigating the vehicle within a certain distance of any dynamic elements navigating through the environment along predicted trajectories of the various dynamic elements.

Figure 7:
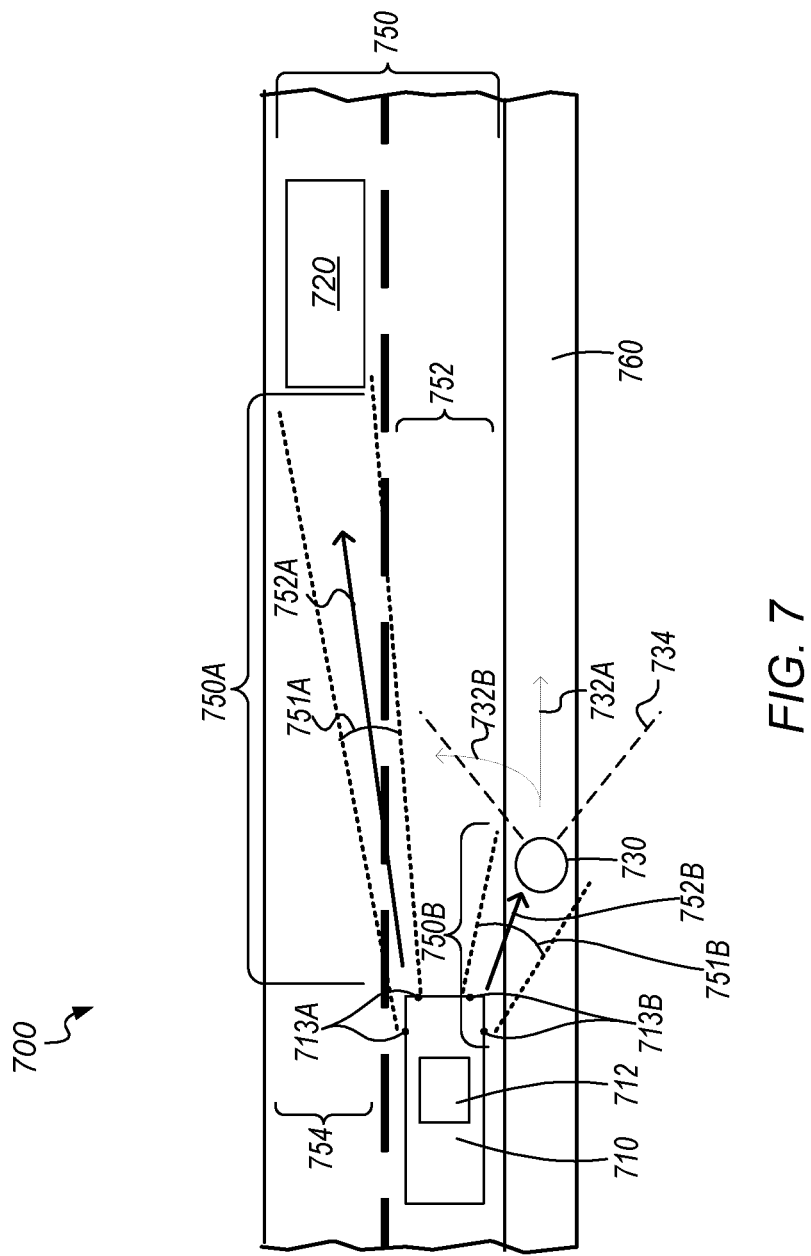
FIG. 7 illustrates an overhead view of an environment in which multiple dynamic elements are located, including a vehicle which is autonomously navigated through the environment and includes a set of indicators which can generate a set of targeted signals which are transmitted to specific dynamic elements in the external environment, according to some embodiments.

FIG. 7 illustrates an overhead view of an environment in which multiple dynamic elements are located, including a vehicle which is autonomously navigated through the environment and includes a set of indicators which can generate a set of targeted signals which are transmitted to specific dynamic elements in the external environment, according to some embodiments. Vehicle 710 can include any of the embodiments of vehicles included herein, and ANS 712 can include any of the embodiments of ANSs included herein.

In some embodiments, a vehicle includes one or more sets of signal generators which can be commanded by an ANS included in the vehicle to generate one or more targeted signals which are directed to one or more particular target elements included in the external environment in which the vehicle is located. A targeted signal can include a signal which is transmitted along a particular selected angle and axis which results in the signal passing through a restricted portion of the external environment in which the target element is located, so that the signal is at least partially restricted from being received at one or more other elements included in the environment. A targeted signal which is directed at a particular target element in the environment can include one or more particular instances of information, including one or more particular messages, which is at least partially associated with the target element. In some embodiments, a target signal includes information which is selected, at the ANS included in a vehicle, based at least in part upon a predicted trajectory of the target element through the external environment.

In some embodiments, separate signal generators, also referred to herein interchangeably as signal devices, included in a vehicle can generate separate targeted signals which are directed to separate target elements in the environment, where the separate targeted signals include separate instances of information which are included in the separate signals based on the separate target elements to which the separate targeted signals are directed.

In the illustrated embodiment shown in FIG. 7, a vehicle 710 navigating through environment 700 includes an ANS 712 and separate sets 713A-B of signal generators. The vehicle 710 is being navigated along lane 752 of roadway 750. The environment 700 further includes dynamic elements 720, 730, where element 720 includes a vehicle navigating along lane 754 of roadway 750 and element 730 includes a pedestrian navigating along sidewalk 760 which extends along an edge of the roadway 750 which is proximate to lane 752.

As shown in the illustrated embodiment, vehicle 710 generates separate targeted signals 750A-B which are separately directed to a separate one of elements 720, 730 in environment 700.

Targeted signal 750A is generated by a particular set of signal generators 713A included in vehicle 710 and is directed towards vehicle 720 along a particular axis 752A and angle 751A of transmission, such that signal 750A passes through a limited portion of environment 700 in which vehicle 720 passes, so that the signal 750A is received by a limited portion of the elements 720, 730 included in the environment 700. ANS 712 can determine a particular axis 752A and angle 751A of a targeted signal to direct to element 720 and can select a particular configuration of signal generators 713A which can generate and transmit the signal 750A along the particular axis 752A and angle 751A. ANS 712 can further command the selected signal generators 713A to generate the targeted signal 750A including a particular set of information, also referred to herein as a particular set of content, and directed, along axis 752A and angle 751A, towards element 720.

ANS 712 can determine the axis 752A and angle 751A of the signal 750A based on identification of a size, position, velocity, acceleration, etc. of the dynamic element 720 through the environment, a predicted trajectory of the element 720 through the environment, some combination thereof, etc. The signal 750A can include information which includes a message which, when communicates one or more signals, alerts, messages, etc. to element 720. For example, in some embodiments, signal 750A can include a message which communicates, to element 720, information regarding traffic conditions, particular dynamic elements, events, etc. associated with one or more portions of environment 700. Signal 750A can include information indicating an occurrence of stopped vehicles in a portion of the environment 700 which through which vehicle 710 has previously navigated. Signal 750A can include information which communicates, to vehicle 720, a driving route along which vehicle 710 is being navigated by ANS 712. Signal 750A can include a warning signal.

ANS 712 can determine to generate signal 750A, determine a particular angle 751A and axis 752A of signal 750A, select a particular set of signal generators 713A to generate the signal 750A in a particular generator configuration, determine one or more particular instances of information to include in the signal, command the set of generators 713A to generate the targeted signal, some combination thereof, etc. based at least in part upon one or more of detecting the dynamic element 720 in the environment, generating a predicted trajectory of the dynamic element 720 through the environment 700, some combination thereof, etc.

Targeted signal 750B is generated by a particular set of signal generators 713B included in vehicle 710 and is directed towards pedestrian 730 along a particular axis 752B and angle 751B of transmission, such that signal 750B passes through a limited portion of environment 700 in which pedestrian 730 passes, so that the signal 750B is received by a limited portion of the elements 720, 730 included in the environment 700. ANS 712 can determine a particular axis 752B and angle 751B of a targeted signal 750B to direct to element 730 and can select a particular configuration of signal generators 713B which can generate and transmit the signal 750B along the particular axis 752B and angle 751B. ANS 712 can further command the selected signal generators 713B to generate the targeted signal 750B including a particular set of information and directed, along axis 752B and angle 751B, towards element 730. ANS 712 can determine the axis 752B and angle 751B of the signal 750B based on identification of a size, position, velocity, acceleration, etc. of the dynamic element 730 through the environment, a predicted trajectory of the element 730 through the environment, some combination thereof, etc. The signal 750B can include information which includes a message which, when received at dynamic element 730, communicates one or more signals, alerts, messages, etc. to element 730. For example, in some embodiments, signal 750B can include a message which communicates, to element 730, information regarding traffic conditions, particular dynamic elements, events, etc. associated with one or more portions of environment 700. Signal 750B can include information which communicates, to pedestrian 730, a driving route along which vehicle 710 is being navigated by ANS 712. Signal 750B can include a warning signal.

ANS 712 can determine to generate signal 750B, determine a particular angle 751B and axis 752B of signal 750B, select a particular set of signal generators 713B to generate the signal 750B in a particular generator configuration, determine one or more particular instances of information to include in the signal, command the set of generators 713B to generate the targeted signal, some combination thereof, etc. based at least in part upon one or more of detecting the dynamic element 730 in the environment, generating a predicted trajectory of the dynamic element 730 through the environment 700, some combination thereof, etc. For example, as shown, ANS 712 can determine that, where dynamic element 730 is a pedestrian, a field of view 734 of the pedestrian 730 and one or more predicted trajectories 732-B through the environment 700. Based at least in part upon one or more of determining that the vehicle 710 is not within the field of view 734 of the pedestrian 730, determining that one or more predicted trajectories 732A-B of the pedestrian may intersect a driving route along which the vehicle 710 is being navigated, some combination thereof, etc.

ANS 712 can determine a targeted signal to transmit to pedestrian 730 which includes information which communicates one or more of a warning to the pedestrian 730 of the presence of the vehicle 710 in the environment 700, a message to the pedestrian 730 to refrain from navigating along one or more particular trajectories 732A-B through the environment, etc. For example, the signal 750B can include an audio message which warns the pedestrian 730 to avoid moving into the lane 752 of the roadway 750. As a result, the vehicle 710 can respond to a prediction, at ANS 712, that the pedestrian 730 may move along a trajectory which intersects a driving route of the vehicle 710 by, rather than adjusting the driving route of the vehicle 710 to avoid intersection with the predicted trajectory of the pedestrian, generate a targeted signal which prompts the pedestrian to avoid moving along a trajectory which intersects the present driving route. As a result, the risk of paths intersecting between the vehicle 710 and dynamic elements in the external environment through which the vehicle 710 is being navigated can be reduced, thereby augmenting safety for occupants of vehicle 710 and various dynamic elements in the environment 700.

In some embodiments, one or more of the targeted signals 750A-B includes a visual signal. For example, the targeted signal 750A can be generated by one or more visual signal generators 713A, including one or more lights, included in the vehicle 710, where a particular set of visual indicators are activated to generate a particular visual signal 750A which includes one or more instances of information. The visual indicators 713A can include at least a portion of one or more headlight assemblies included in the vehicle 710, where a portion of the headlight assemblies can be adjusted to direct a light beam having a particular axis 752A and angle 751A to a particular dynamic element 720 in the environment 700. The headlight assemblies can be adjusted to provide a visual signal 750A which includes a variable-intensity beam of light, including a series of light beam pulses, etc.

In some embodiments, one or more of the targeted signals 750A-B includes an audio signal which is directed at a particular dynamic element, including a traffic participant, instance of fauna, etc. located in the external environment. For example, the targeted signal 750B can include an audio signal which can be a directional signal which is focused in angle and axis via various known systems and methods of focused audio signals, including one or more of beamforming, ultrasonic modulation, etc., so that the recipient of the audio signal 750B is at least partially restricted to the particular dynamic element 730 to which the targeted signal 750B is directed. As a result, the amplitude of the signal can be reduced, relative to a non-focused audio signal, which can result in reduced disturbance in the external environment as a result of the signal transmission. In addition, as a result of the amplitude of the signal being reduced, information communicated to the dynamic element via the targeted signal can be at least partially precluded from being received and interpreted by other dynamic elements in the environment, thereby providing at least some information security.

In some embodiments, ANS 712 selects a type of targeted signal to generate and direct to a particular dynamic element based on one or more various identified contextual cues associated with the particular dynamic element, a position, velocity, acceleration, etc. of one or more of the particular dynamic element and the vehicle 710 through the environment 700, some combination thereof, etc. For example, ANS 712 can determine to generate signal 750A as a visual signal based at least in part upon a determination that dynamic element 720 is a vehicle, that the vehicle 710 is included within a field of view of the vehicle 720, that one or more of vehicles 710, 720 are moving through environment 700 within a certain range of velocities, that a distance between vehicles 710, 720 is greater than a certain threshold distance, some combination thereof, etc. In another example, ANS 712 can determine to generate signal 750B as an audio signal based at least in part upon a determination that dynamic element 730 is a pedestrian, that the vehicle 710 is not included within the field of view 734 of the pedestrian 730, that, that a distance between vehicle 710 and pedestrian 730 is less than a certain threshold distance, some combination thereof, etc.

In some embodiments, ANS 712 determines to refrain from generating a targeted signal directed to a particular target dynamic element, based at least in part upon one or more of relative proximity, relative velocity, etc. of the target dynamic element and the vehicle in which the ANS 712 is included. For example, where the relative velocity of vehicle 710 and vehicle 720 exceeds a threshold, the value provided by signal 750A may be restricted, as amount of elapsed time between the signal 750A being received at vehicle 720 and vehicles 710, 720 passing each other may be less than an estimated amount of time required for the signal 750A to be processed at vehicle 720.

Figure 8:
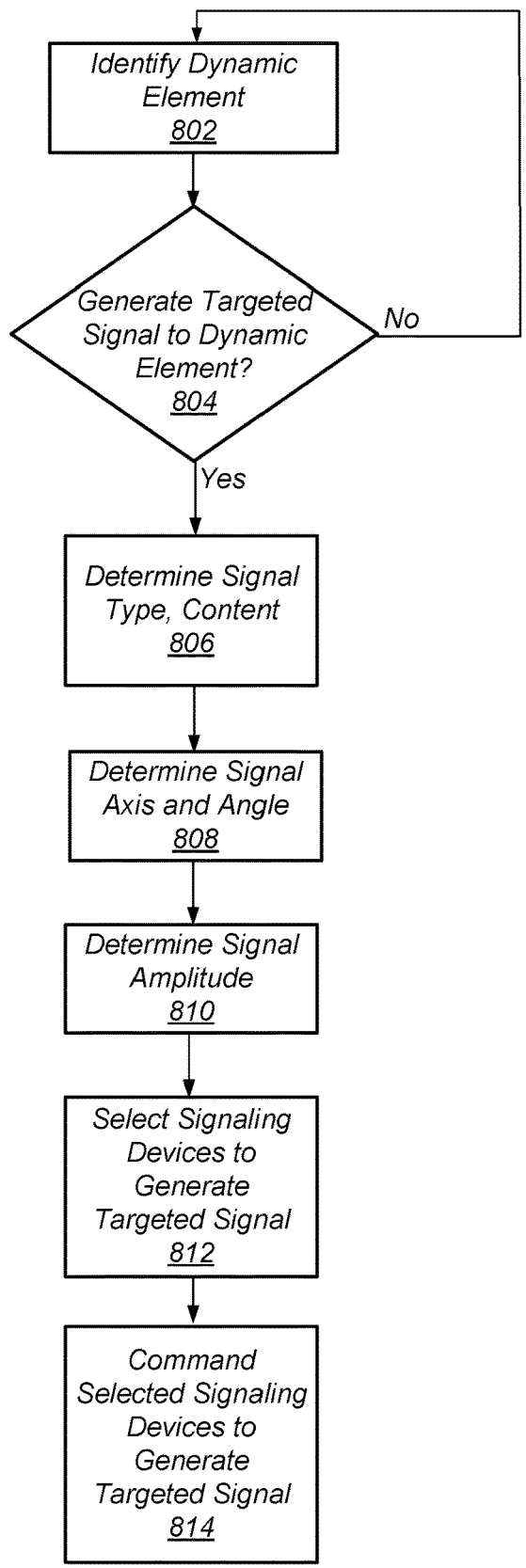
FIG. 8 illustrates generating targeted signals which are directed to particular target dynamic elements, according to some embodiments.

FIG. 8 illustrates generating targeted signals which are directed to particular target dynamic elements, according to some embodiments. The generating can be implemented by one or more portions of any embodiment of ANS included in any embodiments herein. An ANS can be implemented by one or more computer systems.

At 802, a dynamic element is identified in an external environment. The identification can be based at least in part upon processing one or more instances of sensor data generated by one or more sensor devices included in one or more vehicles in the external environment. Identifying the dynamic element can include identifying one or more contextual cues associated with the dynamic element, generating one or more predicted trajectories of the dynamic element through the environment, etc.

At 804, a determination is made regarding whether to generate a targeted signal which is directed to the identified dynamic element. The determination can be based at least in part upon one or more of a determination of whether the vehicle in which the ANS implementing to determination 804 is included is located within a field of view of the dynamic element, a determination of whether a predicted trajectory of the dynamic element intersects a driving route along which the vehicle in which the ANS implementing determination 804 is included is located is being navigated, etc., a determination regarding whether the dynamic element is moving along a trajectory which approaches one or more elements in the external environment previously detected based on processing sensor data, etc.

In some embodiments, a determination regarding whether to generate a targeted signal is based at least in part upon a determination regarding whether a present velocity of the vehicle in which the ANS implementing determination 804 is included is greater than a threshold value. For example, if the vehicle is moving greater than a threshold velocity, a determination can be made to not generate a targeted signal, as the high velocity of the vehicle can at least partially preclude generated signals from being properly received and interpreted by a target dynamic element prior to the vehicle passing a closest proximity to the target dynamic element.

At 806, if a determination is made to generate a targeted signal which is directed to the dynamic element, a signal type of the signal, and one or more instances of content to be included in the signal, are determined. Various signal types can include audio signals, visual signals, some combination thereof, etc. A signal type of the targeted signal can be based at least in part upon one or more various contextual cues associated with the identified dynamic element, etc. For example, where a contextual cue associated with a dynamic element indicates that the dynamic element is a pedestrian, the signal type determined at 806 can include an audio signal type. In another example, where a contextual cue associated with the dynamic element indicates that the dynamic element is a vehicle, the signal type determined at 806 can include a visual signal type.

The content of a signal, also referred to herein interchangeably as one or more instances of information included in the signal, can be determined based on one or more of the field of view of the dynamic element, a predicted trajectory of the dynamic element, one or more elements of the external environment, etc. For example, where the field of view of the dynamic element excludes the vehicle in which the ANS implementing determination 806 is included, the signal content determined at 806 can include a signal, message, alert, etc. which is configured to communicate a presence of the vehicle. In another example, where a predicted trajectory of the dynamic element intersects the driving route along which the vehicle in which the ANS implementing determination 806 is included is being navigated, the signal content determined at 806 can include a warning message which is configured to warn the dynamic element to avoid navigating along the predicted trajectory. In another example, where the vehicle in which the ANS implementing determination 806 is included has previously navigated proximate to one or more particular elements in the environment, including one or more traffic accidents, construction zones, stopped vehicles proximate to the roadway, traffic hazards, etc., the signal content determined at 806 can include a message which communicates one or more instances of information regarding the one or more particular elements in the environment.

At 808, one or more of an axis and angle of the targeted signal is determined, which results in a determination of a configuration of the targeted signal which results in the targeted signal, when transmitted along the one or more determined axis and angle, passes through a limited portion of the environment in which the dynamic element is located, so that the targeted signal is restricted from being directed to one or more other elements in the environment. At 810, an amplitude of one or more portions of the signal is determined, which can be based in part upon one or more of relative distance, velocity, acceleration between the vehicle in which the ANS implementing 810 is located and the dynamic element, a content of the signal, a dynamic element type associated with the dynamic element, etc.

At 812, one or more sets of signal devices, included in the vehicle, which are configurable to generate the targeted signal which includes the determined content, amplitude, and the determined one or more of the angle and axis are selected. Selecting one or more sets of signal devices can include determining one or more particular configurations of the signal devices, including orientation, adjustable position, etc. which results in the signal devices being at least partially configured to generate the targeted signal which includes the determined content, amplitude, and the determined one or more of the angle and axis. A set of signal devices can be selected based at least in part upon a determination that the set of signal devices comprises a minimum quantity of signal devices which can generate the targeted signal which includes the determined content, amplitude, and the determined one or more of the angle and axis, etc. At 814, the selected signal devices are commanded to generate targeted signal, where the commanding can include commanding the one or more selected signal devices to be adjustably positioned, oriented, etc. to generate a signal which include the determined one or more of the determined angle and axis of the targeted signal.

Figure 9:
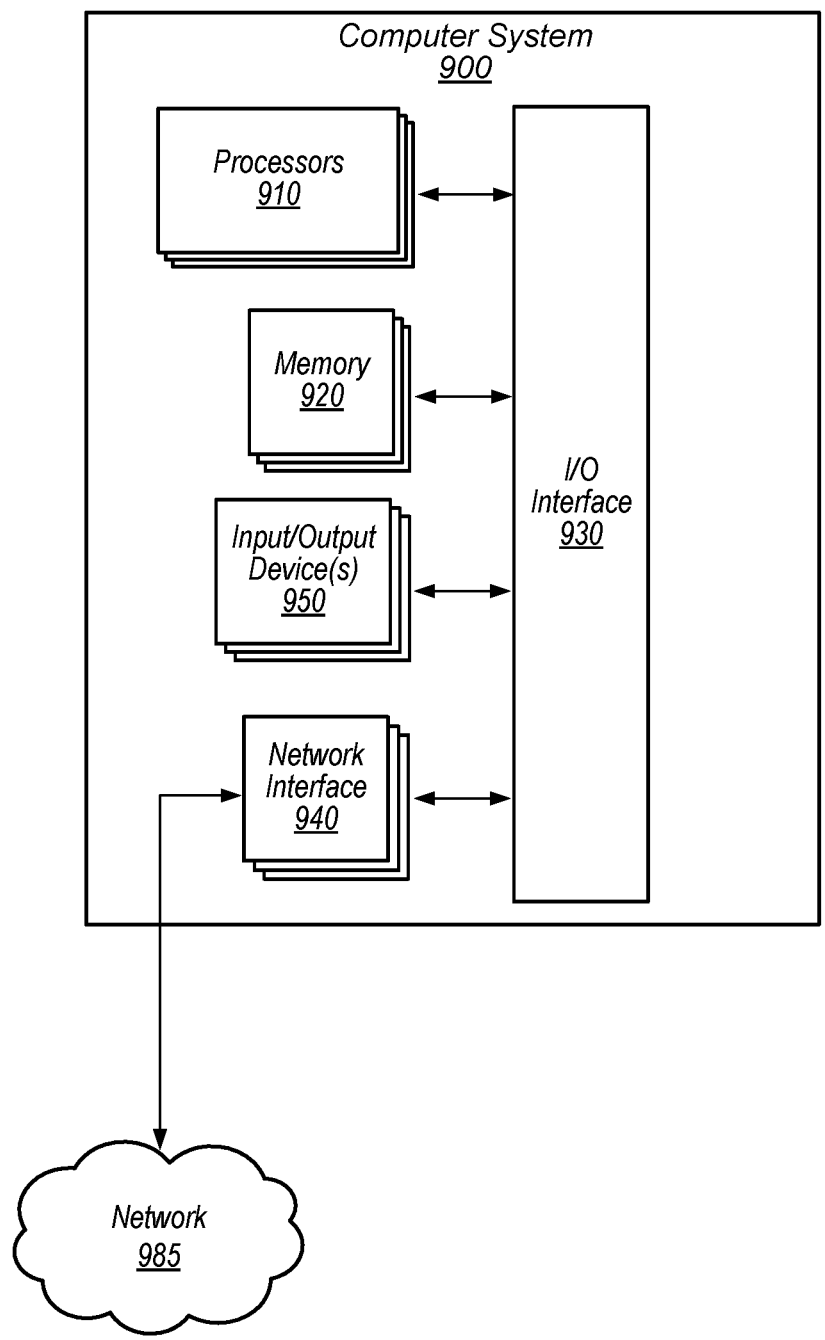
FIG. 9 illustrates an example computer system configured to implement aspects of a system and method for autonomous navigation, according to some embodiments.

FIG. 9 illustrates an example computer system 900 that may be configured to include or execute any or all of the embodiments described above. In different embodiments, computer system 900 may be any of various types of devices, including, but not limited to, a personal computer system, desktop computer, laptop, notebook, tablet, slate, pad, or netbook computer, cell phone, smartphone, PDA, portable media device, mainframe computer system, handheld computer, workstation, network computer, a camera or video camera, a set top box, a mobile device, a consumer device, video game console, handheld video game device, application server, storage device, a television, a video recording device, a peripheral device such as a switch, modem, router, or in general any type of computing or electronic device.

Various embodiments of an autonomous navigation system (ANS), as described herein, may be executed in one or more computer systems 900, which may interact with various other devices. Note that any component, action, or functionality described above with respect to FIGS. 1 through 8 may be implemented on one or more computers configured as computer system 900 of FIG. 9, according to various embodiments. In the illustrated embodiment, computer system 900 includes one or more processors 910 coupled to a system memory 920 via an input/output (I/O) interface 930. Computer system 900 further includes a network interface 940 coupled to I/O interface 930, and one or more input/output devices, which can include one or more user interface (also referred to as "input interface") devices.

In some cases, it is contemplated that embodiments may be implemented using a single instance of computer system 900, while in other embodiments multiple such systems, or multiple nodes making up computer system 900, may be configured to host different portions or instances of embodiments. For example, in one embodiment some elements may be implemented via one or more nodes of computer system 900 that are distinct from those nodes implementing other elements.

In various embodiments, computer system 900 may be a uniprocessor system including one processor 910, or a multiprocessor system including several processors 910 (e.g., two, four, eight, or another suitable number). Processors 910 may be any suitable processor capable of executing instructions. For example, in various embodiments processors 910 may be general-purpose or embedded processors implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA.

System memory 920 may be configured to store program instructions, data, etc. accessible by processor 910. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions included in memory 920 may be configured to implement some or all of an ANS, incorporating any of the functionality described above. Additionally, existing automotive component control data of memory 920 may include any of the information or data structures described above. In some embodiments, program instructions and/or data may be received, sent or stored upon different types of computer-accessible media or on similar media separate from system memory 920 or computer system 900. While computer system 900 is described as implementing the functionality of functional blocks of previous Figures, any of the functionality described herein may be implemented via such a computer system.

In one embodiment, I/O interface 930 may be configured to coordinate I/O traffic between processor 910, system memory 920, and any peripheral devices in the device, including network interface 940 or other peripheral interfaces, such as input/output devices 950. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices attached to a network 985 (e.g., carrier or agent devices) or between nodes of computer system 900. Network 985 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 940 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices may, in some embodiments, include one or more display terminals, keyboards, keypads, touchpads, scanning devices, voice or optical recognition devices, or any other devices suitable for entering or accessing data by one or more computer systems 900. Multiple input/output devices may be present in computer system 900 or may be distributed on various nodes of computer system 900. In some embodiments, similar input/output devices may be separate from computer system 900 and may interact with one or more nodes of computer system 900 through a wired or wireless connection, such as over network interface 940.

Memory 920 may include program instructions, which may be processor-executable to implement any element or action described above. In one embodiment, the program instructions may implement the methods described above. In other embodiments, different elements and data may be included. Note that data may include any data or information described above.

Those skilled in the art will appreciate that computer system 900 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 900 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 900 may be transmitted to computer system 900 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. An apparatus, comprising:
    a navigation system comprising one or more processors and memory and configured to:
        identify a set of contextual cues associated with a dynamic element, the identification based on monitoring of an environment in which the dynamic element is located;
        compare the identified set of contextual cues to a plurality of predetermined sets of contextual cues and select, based on the comparison using the identified set of contextual cues, a set of predicted motions associated with a selected one of the predetermined sets of contextual cues;
        associate the dynamic element with the selected set of predicted motions that are associated with the selected predetermined set of contextual cues;
        generate a predicted trajectory of the dynamic element through the environment based on the set of predicted motions associated with the dynamic element; and
        cause transmission of a targeted signal from a vehicle within the environment toward the dynamic element in the environment, wherein the targeted signal is targeted based on the predicted trajectory, wherein a signal type of the targeted signal is audio, visual, or a combination of audio and visual.

2. The apparatus of claim 1, wherein the navigation system is further configured to:
    determine one or more of a signal axis or an angle along which to send the targeted signal from the vehicle toward the dynamic element based at least in part on the predicted trajectory of the dynamic element; and
    cause the targeted signal to be transmitted from the vehicle toward the dynamic element, wherein the targeted signal is targeted based on the predicted trajectory and according to one or more of the determined angle or the determined signal axis.

3. The apparatus of claim 1, wherein the navigation system is further configured to:
determine, based at least in part on the predicted trajectory of the dynamic element, an amplitude of one or more portions of the targeted signal to be transmitted to the dynamic element from the vehicle within the environment; and
cause the targeted signal to be transmitted with the determined amplitude from the vehicle within the environment toward the dynamic element in the environment.

4. The apparatus of claim 1, wherein the navigation system is further configured to:
generate the targeted signal based at least in part on at least one of:
a determination that the vehicle is located within a field of view of the dynamic element;
a determination that the predicted trajectory of the dynamic element intersects a driving route along which the vehicle is being navigated;
a determination that the dynamic element is moving along a trajectory that approaches one or more previously detected elements in the environment; or
a determination that a velocity of the vehicle is less than a threshold.

5. The apparatus of claim 1, further comprising:
a signal generator configured to generate the targeted signal, wherein the navigation system is further configured to:
command the signal generator to generate the targeted signal.

6. The apparatus of claim 1, wherein the apparatus is further configured to:
determine content to be included in the targeted signal based at least in part on one or more of:
a field of view of the dynamic element;
the predicted trajectory of the dynamic element; or
one or more other elements of the environment; and
include the determined content in the targeted signal transmitted from the vehicle within the environment toward the dynamic element in the environment.

7. The apparatus of claim 1, wherein the targeted signal is targeted so that the targeted signal is restricted from being directed to one or more other elements in the environment based on the predicted trajectory.

8. A method, comprising:
identifying a set of contextual cues associated with a dynamic element, the identification based on monitoring of an environment in which the dynamic element is located;
comparing the identified set of contextual cues to a plurality of predetermined sets of contextual cues, and selecting based on the comparison, a set of predicted motions associated with a selected one of the predetermined sets of predicted motions;
associating the dynamic element with the selected set of predicted motions that are associated with the selected predetermined set of contextual cues;
generating a predicted trajectory of the dynamic element through the environment based on the set of predicted motions associated with the dynamic element; and
based on the predicted trajectory, causing transmission of a targeted signal from a vehicle within the environment toward the dynamic element in the environment, wherein a signal type of the targeted signal is audio, visual, or a combination of audio and visual.

9. The method of claim 8, further comprising:
determining one or more of a signal axis or an angle along which to send the targeted signal from the vehicle toward the dynamic element based at least in part on the predicted trajectory of the dynamic element; and
causing the targeted signal to be transmitted from the vehicle toward the dynamic element, wherein the targeted signal is targeted based on the predicted trajectory and according to one or more of the determined angle or the determined signal axis.

10. The method of claim 8, further comprising:
determining, based at least in part on the predicted trajectory of the dynamic element, an amplitude of one or more portions of the targeted signal to be transmitted to the dynamic element from the vehicle within the environment; and
causing the targeted signal to be transmitted with the determined amplitude from the vehicle within the environment toward the dynamic element in the environment.

11. The method of claim 8, further comprising:
generating the targeted signal based at least in part on at least one of:
a determination that the vehicle is located within a field of view of the dynamic element;
a determination that the predicted trajectory of the dynamic element intersects a driving route along which the vehicle is being navigated;
a determination that the dynamic element is moving along a trajectory that approaches one or more previously detected elements in the environment; or
a determination that a velocity of the vehicle is less than a threshold.

12. The method of claim 8, further comprising:
commanding a signal generator to generate the targeted signal.

13. The method of claim 8, wherein the targeted signal includes content, the method further comprising:
determining content to be included in the targeted signal based at least in part on one or more of:
a field of view of the dynamic element;
the predicted trajectory of the dynamic element; or
one or more other elements of the environment; and
including the determined content in the targeted signal transmitted from the vehicle within the environment toward the dynamic element in the environment.

14. The method of claim 8, further comprising based on the predicted trajectory, targeting the targeted signal so that the targeted signal is restricted from being directed to one or more other elements in the environment based on the predicted trajectory.

15. A non-transitory, computer-readable medium storing a program of instructions which, when executed by at least one computer system, causes the at least one computer system to:
identify a set of contextual cues associated with a dynamic element, the identification based on monitoring of an environment in which the dynamic element is located;
compare the identified set of contextual cues to a plurality of predetermined sets of contextual cues and select, based on the comparison, a set of predicted motions associated with a selected one of the predetermined sets of contextual cues;

associate the dynamic element with the selected set of predicted motions that are associated with the selected predetermined set of contextual cues;

generate a predicted trajectory of the dynamic element through the environment based on the set of predicted motions associated with the dynamic element; and cause transmission of a targeted signal from a vehicle within the environment toward the dynamic element in the environment, wherein the targeted signal is targeted based on the predicted trajectory, wherein a signal type of the targeted signal is audio, visual, or a combination of audio and visual.

16. The non-transitory, computer readable medium of claim 15, wherein the program of instructions, when executed by the at least one computer system, further cause the at least one computer system to:

determine one or more of a signal axis or an angle along which to send the targeted signal from the vehicle toward the dynamic element based at least in part on the predicted trajectory of the dynamic element; and cause the targeted signal to be transmitted from the vehicle toward the dynamic element according to at least one of the determined angle or the determined signal axis.

17. The non-transitory, computer readable medium of claim 15, wherein the program of instructions, when executed by the at least one computer system, further cause the at least one computer system to:

determine, based at least in part on the predicted trajectory of the dynamic element, an amplitude of one or more portions of the targeted signal to be transmitted to the dynamic element from the vehicle within the environment; and cause the targeted signal to be transmitted having the determined amplitude, from the vehicle within the environment toward the dynamic element in the environment.

18. The non-transitory, computer readable medium of claim 15, wherein the program of instructions, when executed by the at least one computer system, further cause the at least one computer system to:

generate the targeted signal based at least in part on at least one of:

a determination that a location of the vehicle is located within a field of view of the dynamic element;

a determination that the predicted trajectory of the dynamic element intersects a driving route along which the vehicle is being navigated;

a determination that the dynamic element is moving along a trajectory that approaches one or more previously detected elements in the environment; or a determination that a velocity of the vehicle is less than a threshold.

19. The non-transitory, computer readable medium of claim 15, wherein the program of instructions, when executed by the at least one computer system, further cause the at least one computer system to:

include content in the targeted signal transmitted from the vehicle within the environment toward the dynamic element in the environment, wherein the content included in the targeted signal is determined based at least in part on one or more of:

a field of view of the dynamic element;

the predicted trajectory of the dynamic element; or one or more other elements of the environment.

20. The non-transitory, computer readable medium of claim 15, wherein the targeted signal is targeted so that the targeted signal is restricted from being directed to one or more other elements in the environment based on the predicted trajectory.

* * * * *